(12) United States Patent
Rakshit et al.

(10) Patent No.: US 12,306,642 B2
(45) Date of Patent: May 20, 2025

(54) DYNAMIC CHANGING OF CONVEYOR PROFILE BASED ON RANGE OF ROBOT

(71) Applicant: INTERNATIONAL BUSINESS MACHINES CORPORATION, Armonk, NY (US)

(72) Inventors: Sarbajit K. Rakshit, Kolkata (IN); Partho Ghosh, Kolkata (IN); Saraswathi Sailaja Perumalla, Visakhapatnam (IN); Subha Kiran Patnaikuni, Visakhapatnam (IN)

(73) Assignee: International Business Machines Corporation, Armonk, NY (US)

( * ) Notice: Subject to any disclaimer, the term of this patent is extended or adjusted under 35 U.S.C. 154(b) by 630 days.

(21) Appl. No.: 17/654,413

(22) Filed: Mar. 11, 2022

(65) Prior Publication Data
US 2023/0305581 A1   Sep. 28, 2023

(51) Int. Cl.
*G05D 1/10* (2006.01)
*B25J 9/00* (2006.01)
*B65G 61/00* (2006.01)
*G05D 1/00* (2006.01)

(52) U.S. Cl.
CPC ............ *G05D 1/104* (2013.01); *B25J 9/0084* (2013.01); *B65G 61/00* (2013.01)

(58) Field of Classification Search
CPC ........ G05D 1/104; B25J 9/0084; B65G 61/00
See application file for complete search history.

(56) References Cited

U.S. PATENT DOCUMENTS

| | | | |
|---|---|---|---|
| 6,516,935 B1 | 2/2003 | McLennan | |
| 2002/0105296 A1* | 8/2002 | Okuyama | B25J 9/1669 318/568.16 |
| 2012/0165972 A1* | 6/2012 | Wappling | B25J 9/1687 700/213 |
| 2014/0156068 A1* | 6/2014 | Graca | B25J 9/1682 700/255 |

(Continued)

FOREIGN PATENT DOCUMENTS

| | | |
|---|---|---|
| CN | 106444750 A | 2/2017 |
| CN | 107265355 A | 10/2017 |
| CN | 109095059 A | 12/2018 |

OTHER PUBLICATIONS

Mell et al., "The NIST Definition of Cloud Computing", National Institute of Standards and Technology, Special Publication 800-145, Sep. 2011, pp. 1-7.

(Continued)

*Primary Examiner* — Kyle O Logan
(74) *Attorney, Agent, or Firm* — Caleb D. Wilkes

(57) ABSTRACT

A method, computer system, and a computer program product for robot assistance are provided. A computer identifies a position of a first robot in an environment and a range of movement of an arm of the first robot. The computer generates an alignment plan for moving a first conveyor to be aligned with the first robot so that the first conveyor is engageable with the arm of the first robot within the range of movement of the arm. The first conveyor and the first robot include respective supports that are separate from each other. The computer transmits the alignment plan for execution so that the first conveyor is moved according to the alignment plan.

20 Claims, 17 Drawing Sheets

(56) References Cited

U.S. PATENT DOCUMENTS

| | | | |
|---|---|---|---|
| 2015/0057793 A1* | 2/2015 | Kawano | G06Q 10/087 700/216 |
| 2016/0001983 A1 | 1/2016 | Ooba | |
| 2019/0106283 A1 | 4/2019 | Yamaoka | |
| 2019/0135551 A1 | 5/2019 | Sekich | |
| 2019/0369600 A1 | 12/2019 | Lager | |
| 2020/0033883 A1 | 1/2020 | Theobald | |
| 2020/0164518 A1* | 5/2020 | Lager | B25J 9/1697 |
| 2021/0395023 A1* | 12/2021 | Patil | B25J 9/0084 |

OTHER PUBLICATIONS

Rakshit et al., "Dynamic Changing of Conveyor Profile Based on Range of Robot", International Application No. PCT/CN2023/079578, International Filing Date Mar. 3, 2023, 58 pages, claims priority on U.S. Appl. No. 17/654,413 (present application).

International Searching Authority, "International Search Report and Written Opinion of the International Searching Authority", International Application No. PCT/CN2023/079578, Mailed May 7, 2023, 9 pages.

* cited by examiner

DYNAMIC CHANGING OF CONVEYOR PROFILE BASED ON RANGE OF ROBOT

BACKGROUND

The present invention relates generally to robots and more particularly assistance of robots that are performing work in a work environment such as a factory or a warehouse.

Robots have been used to perform various activities in warehouses, factory assembly lines and stations, and machine shopfloors. Although robots may be mobile and may have an arm that has a range of arm movement with various degrees of freedom, positioning of robots and other structures in the environment may nevertheless be a challenge under dynamically changing conditions.

SUMMARY

According to one exemplary embodiment, a method for robot assistance is provided. A computer identifies a position of a first robot in an environment and a range of movement of an arm of the first robot. The computer generates an alignment plan for moving a first conveyor to be aligned with the first robot so that the first conveyor is engageable with the arm of the first robot within the range of movement of the arm. The first conveyor and the first robot include respective supports that are separate from each other. The computer transmits the alignment plan for execution so that the first conveyor is moved according to the alignment plan. A computer system and a computer program product corresponding to the method described above are also provided.

BRIEF DESCRIPTION OF THE DRAWINGS

These and other objects, features, and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a method, computer system, computer program product, and robot assistance system for allowing robots with robotic arms to better collaborate with a conveyor in a working environment such as a factory or a warehouse. The present embodiments allow automated collaboration of robots and conveyors in a working environment so that the conveyors assist the robots in performing various tasks in the working environment. The conveyors may deliver, for example, construction parts, e.g., spare parts, to the robots that the robots may retrieve and use for product assembly or repair. The present embodiments allow many factors and components in a chaotic environment to be better understood and integrated for efficient use of the system components to timely achieve working environment goals such as product assembly. The present embodiments may help improve automation of a working environment and may help overcome challenges of rigidity and of inflexibility that have arisen with previous working environments such as warehouses. The present embodiments achieve a dynamic ability of a working environment to change to adapt to the needs of robots that are working in the environment and based on surrounding circumstances within the environment. If a conveyor sends a good or object along a conveyor path that is outside of a reach of a robot, the robot may miss grasping the good or object. Such a miss may cause a failure or interruption in the working environment operation, because the robot may need the good or object in order for the purpose, e.g., product assembly, of the working operation to be fully fulfilled with optimal timing.

The present embodiments help with organizing and collaboration of a working environment with multiple working elements such as robots, drones, and/or conveyors. The present embodiments may incorporate machine learning to better service robots with parts needed for robot tasks and to improve warehouse/assembly operations. The present embodiments facilitate the dynamic changing of a conveyor and the conveyor profile based on an automated determination of a range of a robot that is to be serviced and/or fed by the conveyor.

Figure 1A:
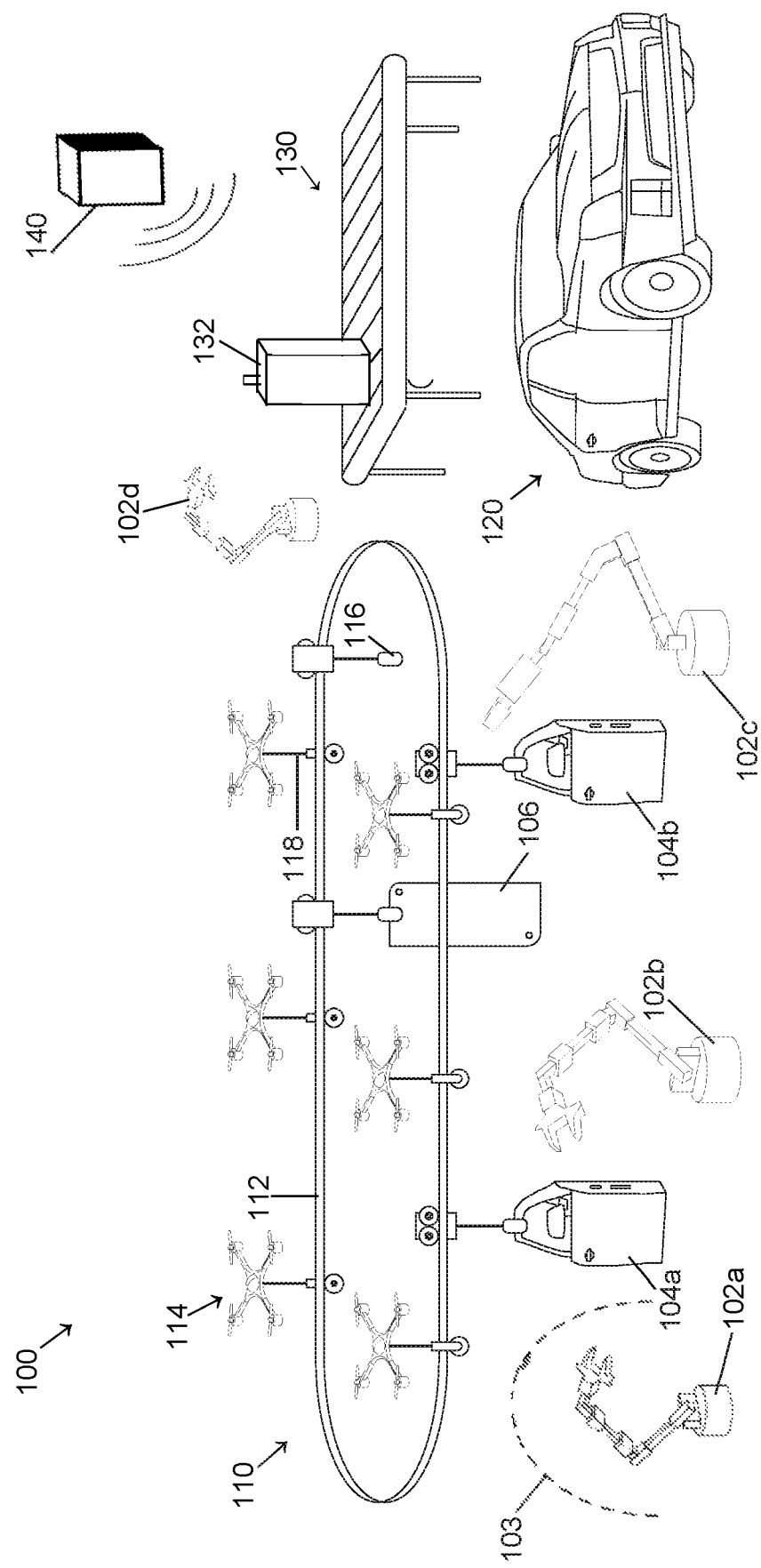
FIG. 1A illustrates a robot assistance environment with working robots and an overhead conveyor according to at least one embodiment.

Referring to FIG. 1A, a robot assistance environment 100 in accordance with an exemplary embodiment is depicted. The robot assistance environment 100 may be in a warehouse or facility (as will be shown in FIGS. 1B, 1C, 2A-2C, and 3A-3C) and may include one or more assembly lines and/or one or more assembly stations. Robots such as a first robot 102a, a second robot 102b, a third robot 102c, and a fourth robot 102d may be performing various tasks within the robot assistance environment 100.

In the example shown in FIG. 1A, the robots are working together to help assemble a product, in this instance a vehicle. FIG. 1 shows a partially-assembled vehicle 120 and shows that the first, second, and third robots 102a, 102b, and 102c, respectively, perform various tasks such as adding further components to the partially-assembled vehicle 120. Based on the collaboration of the robots, other components, and workers, a finished and functioning vehicle may be produced. For example, the third robot 102c may take a door such as the second door 104b from the overhead ropeway conveyor 110 and attach the door to the partially-assembled vehicle 120.

Each of the robots shown has an arm and a base that is being supported on a floor or on a platform of the working environment. In other embodiments, the robots may be mobile and have wheels so that the wheels rest on the floor and/or on a platform of the working environment. Although the robots are shown in FIG. 1A as including one respective arm, in other embodiments one or more robots that are part of the robot assistance environment 100 include more than one arm, respectively, e.g., include two respective arms. Each arm has a range of movement. The first robot 102a is shown in FIG. 1A as having a first arm range of movement 103. Each robot arm will have a respective arm range of movement, although only the first arm range of movement 103 is numbered in FIG. 1A.

The robot assistance program and method described herein may determine the range of movement of each robot arm and use this information along with a particular position of the robot and robot base in order to determine a proper position for the overhead ropeway conveyor 110 so that the overhead ropeway conveyor 110 may be aligned with the robots and so that items being transported by the overhead ropeway conveyor 110 may be grasped by the robots and removed from the overhead ropeway conveyor 110.

A conveyor, in this example an overhead ropeway conveyor 110 is disposed over and/or above the robots, delivers assembly parts to the robots. The overhead ropeway conveyor 110 may include a rope 112 that is circulated around a conveyor path so that objects attached to and/or carried by the rope 112 may be conveyed towards robot working positions where the objects can be taken by the robots. This circulating structure may in other embodiments be a cable, a strand, a twine, a cord, a chain, a line, and/or a tie in addition to or in place of the rope 112. The circulating structure is flexible and strong to support the weight of fasteners and objects being transported on the fasteners. Such objects are held/carried by the rope 112 as the rope 112 is circulated around the conveyor.

This ropeway conveyor may be referred to as an overhead ropeway conveyor 110 due to its positioning above a working environment floor and due to its supporting structure extending upwards instead of directly down to the floor. In this example the overhead ropeway conveyor 110 is being supported in the air by flying drones, with a first drone 114 being labeled in FIG. 1A. Each drone may respectively include and/or hold a support arm 118 which extends from the respective drone and has structure for supporting the overhead ropeway conveyor 110, the rope 112 of the overhead ropeway conveyor 110, and via the rope 112 the items that are being conveyed by the overhead ropeway conveyor 110. Thus, the support structures such as the support arm 118 may be considered to, via the rope 112, indirectly support the items being conveyed such as the first door 104a and the second door 104b. In other embodiments such as are shown in FIGS. 2A-2C and 3A-3C, other support arms that support another overhead conveyor may be connected to a ceiling of a warehouse or facility instead of being continually supported by flying drones. FIG. 1A shows the support arm 118 extending upwards from the rope 112 and downwards from the respective drone. In other embodiments, a support arm could be connected to a flying drone and extend upwards from the respective flying drone so that the drones are positioned underneath the rope 112.

After the items have been circulated into a position in which one or more robots can grasp the item, the robots retrieve the items/assembly parts from the rope 112. After retrieving the objects from the rope 112, the robots at the appropriate time add the assembly parts to the workpiece that is being built, in this example the partially-assembled vehicle 120. The third robot 102c is shown in FIG. 1A as being in a third robot initial working position where within its grasping range of its robot arm the third robot 102c can grasp an item such as the second door 104b and attach it in the appropriate position on the frame of the partially-assembled vehicle 120.

The overhead ropeway conveyor 110 transports fasteners and/or holders e.g., trays, that may hold and/or support an item being conveyed such as the first door 104a, the second door 104*b*, and the panel 106. FIG. 1A shows a fastener 116 that is not currently supporting an item for conveyance.

A robot such as the fourth robot 102*d* may grasp and retrieve an item such as the hooked object 132 from the ground conveyor 130 and place the item onto the fastener 116. The fourth robot 102*d* may grasp a hook of the hooked object 132, rotate and extend the arm and then place the hook of the hooked object 132 onto the fastener 116. In other embodiments a drone may retrieve items from the ground conveyor 130 and then fly upwards and load the retrieved item onto an empty hook/fastener/tray that is part of the overhead conveyor and is circulated around the pathway of the overhead conveyor. In other embodiments a human might retrieve items from the ground conveyor 130 and load the retrieved item onto an empty hook/fastener/tray of the overhead conveyor.

After the hooked object 132 is on the fastener 116, circulation of the rope 112 may convey the hooked object 132 into another position in which one of the first, second, and third robots 102*a*, 102*b*, 102*c*, respectively, may retrieve and use the hooked object 132 for a work project such as assembly of a workpiece. Each, some, and/or one of the holders, e.g., the fastener 116, of the overhead ropeway conveyor 110 may transport a component that one of the robots may retrieve and then use for assembly of the product, in this case the partially-assembled vehicle 120.

A controller 140 is shown in the assistance environment 100 which may sense and/or determine which robots are in the assistance environment 100, the positions of the robots in the assistance environment 100, the tasks of the robots in the assistance environment 100, the range of movement of the robot arms of the robots, the sizes of items to be conveyed by the conveyors, and the type of conveyor and conveyor support structure in the assistance environment 100. The controller 140 may be a computer, e.g., a mobile computer, an embedded system, a laptop, a tablet, a desktop computer, etc., and may include a camera and/or other sensors to determine the presence of robots and their positions in the robot assistance environment 100, conveyors and their sizes and positions in the robot assistance environment 100, and goods to be conveyed and their sizes and positions in the robot assistance environment 100. The sensors may include active and/or passive sonar sensors. The controller 140 may receive data and other signals and may itself process the information to help generate a collaboration plan or may transmit the data to one or more further computers for the other computers to generate a collaboration plan. The controller 140 may identify a position of the first robot 102*a* in the robot assistance environment 100 and the first arm range of movement 103 of the arm of the first robot 102*a*. The controller 140 may use this information to generate an alignment plan for moving the overhead ropeway conveyor 110 to be aligned with the first robot 102*a* so that the overhead ropeway conveyor 110 engages with the arm of the first robot 102*a* within the first arm range of movement 103 while the first robot 102*a* performs an activity. The controller 140 may determine and/or sense a position of an item as the item is conveyed by the overhead ropeway conveyor 110. The controller 140 may use a fastening point such as the hook of the hooked object 132 and the size of the respective object, e.g., the hooked object 132, to determine the positions of the respective object during the conveyance to ensure that the alignment plan will bring the respective object within the robot arm range of movement so that the robot can grasp the object without having to move its base. The controller 140 transmits the alignment plan for execution so that the overhead conveyor 110 is moved according to the alignment plan. In this example, the alignment plan may be transmitted to one or more of the drones such as the first drone 114 so that the drones move and thereby move the overhead ropeway conveyor 110 better into the first arm range of movement 103. The controller 140 and/or another computer with a robot assistance program 210*a*, 210*b* may also control a conveyance speed of the conveyors to help achieve optimal robot performance and working environment purposes. The controller 140 may also in some instances determine that the respective robot must move to be able to grasp an item being conveyed by the overhead conveyor, so that the alignment plan may include some movement, e.g., a small movement, for the respective robot, to be able to grasp the object from the overhead ropeway conveyor 110 and then for the robot to perform a reciprocal movement back to a task-finishing position for the robot.

FIG. 1A illustrates that respective bases of the first, second, third, and fourth robots 102*a*, 102*b*, 102*c*, and 102*d*, respectively, are supported on a floor or a platform of a working area. In contrast, the overhead ropeway conveyor 110 is supported by the flying drones which are separate from the floor or platform on which the robots are resting. Thus, the overhead conveyor includes a support structure that is separate from the support structure that holds up the robots in the working area. This separation of the support structure may be consistent in the various embodiments such as those shown in FIGS. 2A-2C, 3A-3C, 4A-4B, and 5 that will be discussed subsequently. Due to the separation of the support structures, at least some of the present embodiments may include enhanced flexibility for warehouse design so that robots may be assisted and goods may be conveyed to the robots with a minimization of interference of other activities that are occurring in this particular working environment.

FIG. 1A shows that the support arms 118 carried by the drones may support a weight-bearing circulation roller. The rope 112 may circulate by rolling on top of these weight-bearing circulation rollers that are distributed around the periphery of the circulation path of the rope 112. Each fastener 116 may be connected via a fastener support arm to a glider with one or more glider roller wheels which may roll on top of the rope 112 as the fastener 116, whether empty or carrying and conveying an item, circulates along the rope 112. In embodiments where gravity force is used, the weight of the conveyed item may cause gliding of the fastener roller wheels along the rope path. This weight may also cause return of the rope and empty fastener from the robot position (where the conveyed good was unloaded) back to a loading position where the empty fastener may receive a new good to convey to the robots. In some embodiments, each fastener glider may include a drive and/or a motor inside the glider to generate glider wheel rotation to force the glider, the attached fastener 116, and any item attached to the fastener 116 along the ropeway path. In other embodiments the rope 112 of the conveyor may at one end be inserted to a drive and/or a gear which pulls the rope 112 to generate movement of the overhead ropeway conveyor 110. In some embodiments, the fasteners may be connected to the rope 112 with a stationary fastening point and the overhead ropeway conveyor 110 circulates by the drones such as the first drone 114 flying in a circular, oval, rectangular pattern etc.

Figure 1B:
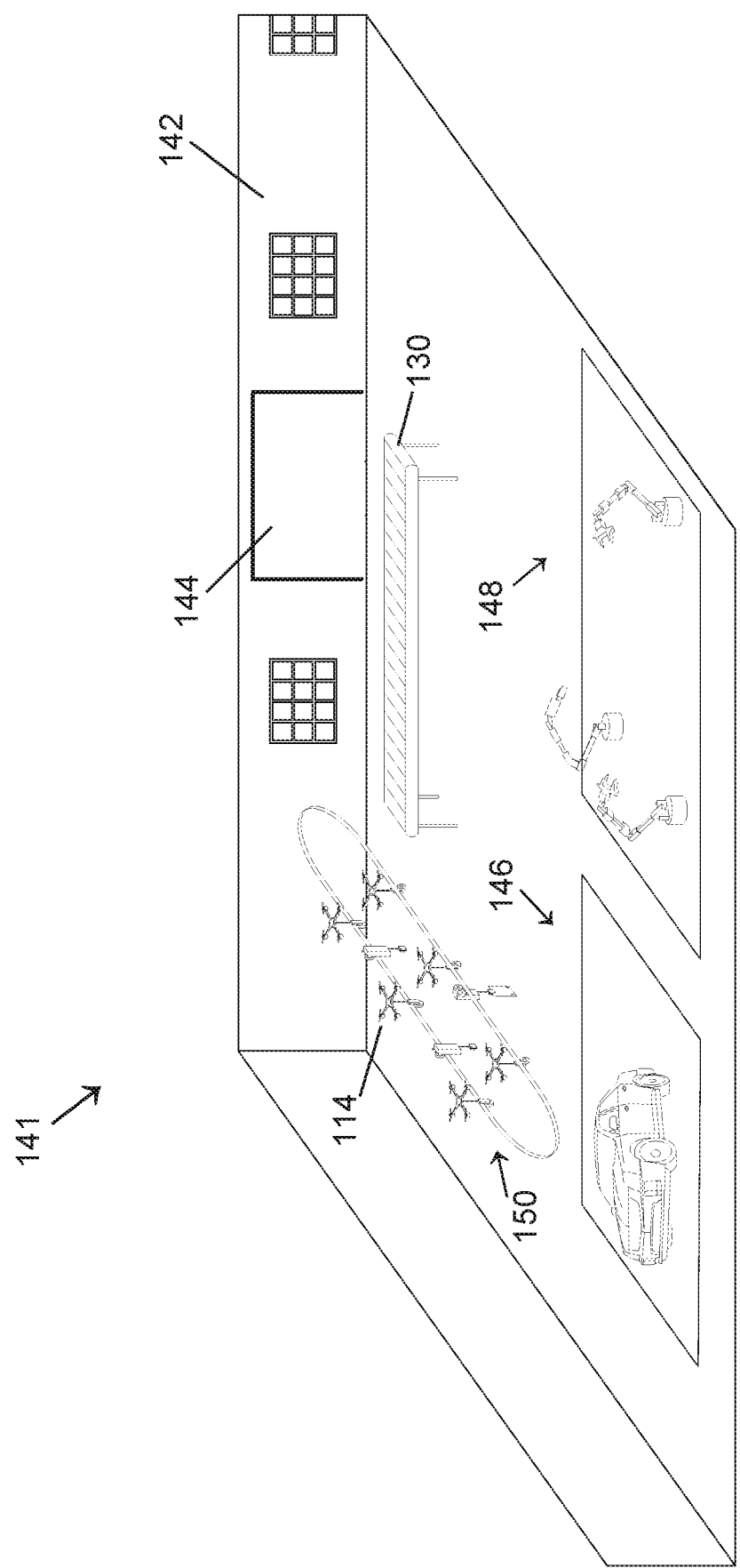
FIG. 1B illustrates a robot assistance environment in a warehouse with an overhead conveyor that is disposed in a first overhead conveyor position according to at least one embodiment.

FIG. 1B illustrates another robot assistance environment 141 that includes a warehouse 142, robots, and an overhead conveyor system. Many or all of the components shown in the robot assistance environment 100 shown in FIG. 1A are implemented in the other robot assistance environment 141 shown in FIG. 1B. The warehouse 142 may include a truck loading door 144 via which goods may be received and/or transmitted for shipping. Within the warehouse 142 is a first robot work area 146 where one or more robots may be positioned to perform a work task such as assembling a workpiece, e.g., a vehicle. In the view shown in FIG. 1B, the overhead conveyor system is positioned in a first overhead conveyor position 150 so as to be able to be aligned with one or more robots that would be working within or by first robot work area 146. FIG. 1B shows, however, that the robots have moved to a second robot work area 148 in order to perform new tasks. A control computer for the warehouse 142 may sense/determine that the robots have moved to the second robot work area 146 and may generate and transmit an alignment plan to the drones such as the first drone 114 of the overhead conveyor system to instruct the drones to move the overhead conveyor system to be aligned with the robot in the second robot work area 148. The drones may fly in unison to move the rope and other support structure over toward the second robot work area 148.

Figure 1C:
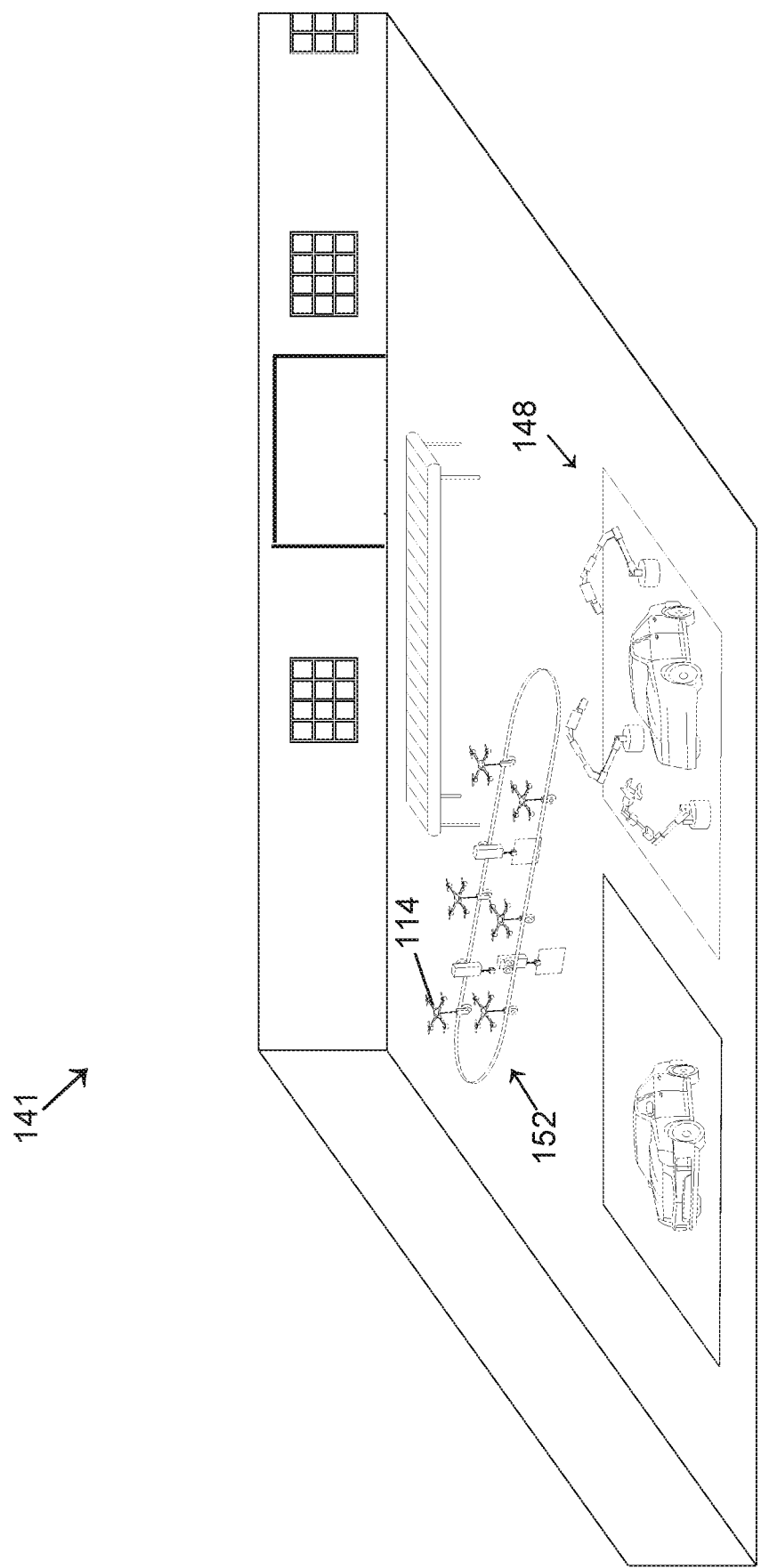
FIG. 1C illustrates the robot assistance environment and warehouse of FIG. 1B with the overhead conveyor having moved to a second overhead conveyor position according to at least one embodiment.

FIG. 1C illustrates the instance after the drones have flown and moved the overhead conveyor system to a second overhead conveyor position 152 so as to be aligned with one or more of the robots that are positioned in the second robot work area 148. In this instance, the movement of the drones may have included a pivoting movement whereby a rear of the overhead conveyor remains in a vicinity of the ground conveyor 130 and a leading end of the overhead conveyor is above, near, and/or at the second robot work area 148. Thus, one or more of the robots that are positioned to perform tasks at the second robot work area 148 may retrieve an item such as a panel that is being conveyed by the overhead conveyor after the overhead conveyor moves to the second overhead conveyor position 152 via flying movement of the flying drones.

Thus, when the overhead conveyor is in both the first overhead conveyor position 150 shown in FIGS. 1B and 1*n* the second overhead conveyor position 152 shown in FIG. 1C an item being transported along the ground conveyor 130 may be retrieved by a robot that is positioned near the end of the ground conveyor 130. Such robot may then place/fasten the retrieved good onto a fastener/holder of the overhead conveyor for conveying the object to the robots that are performing tasks. Thus, goods may be unloaded via the truck loading door 144, placed onto the ground conveyor 130, conveyed via the ground conveyor 130, then placed via a person or a robot onto the overhead conveyor, and then conveyed to robots working in another area of the warehouse 142. The ground conveyor 130 may be positioned closely against the wall of the warehouse 142 so as to reserve much open space within the warehouse 142 for movement by people, forklifts, and/or wheeled robots. Using an overhead conveyor may preserve significant warehouse floor space as being open for movement.

It should be appreciated that FIGS. 1A-1C provide illustrations of some implementations and do not imply any limitations with regard to the environments in which the robot assistance system and method may be implemented. Many modifications to the depicted environments and structures may be made based on design and implementation requirements.

Figure 2A:
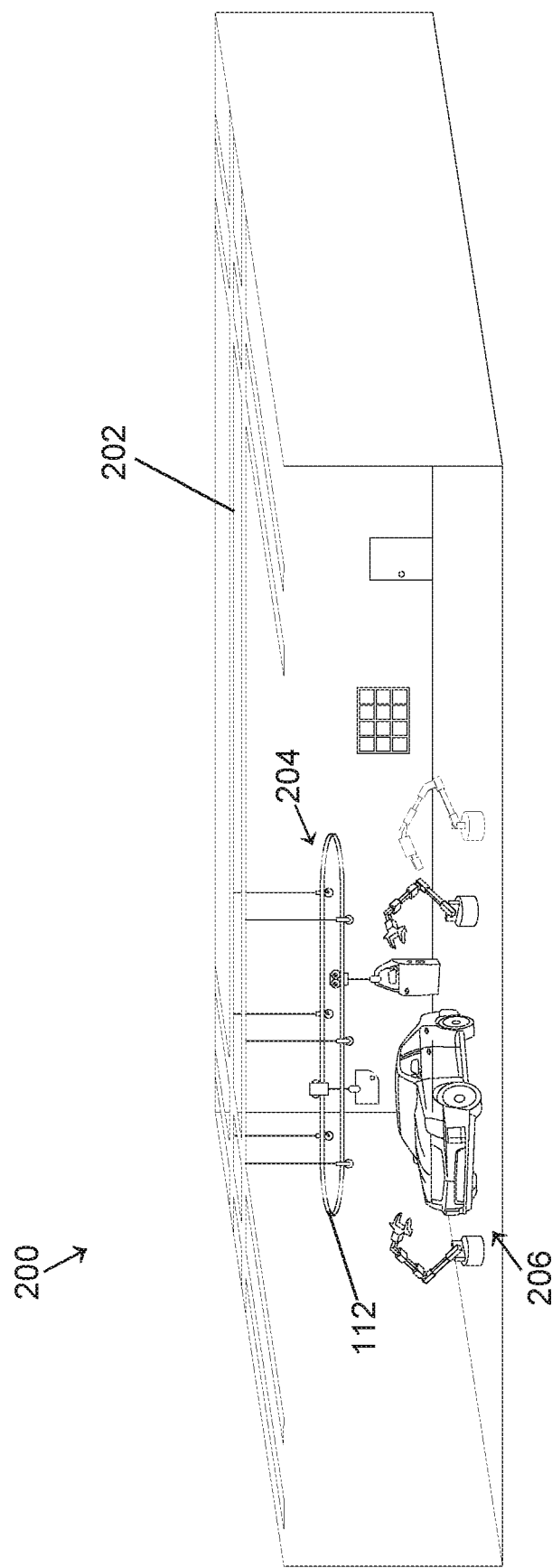
FIG. 2A illustrates a robot assistance environment for an alternative warehouse which includes an overhead track for an overhead conveyor and shows the overhead conveyor and working robots in first positions according to at least one embodiment.

FIG. 2A illustrates a robot assistance environment for an alternative warehouse 200 which includes an overhead track 202 that is fastened and/or connected to a ceiling of the alternative warehouse 200. Support arms may extend downward from the overhead track and may include structure for supporting a rope 112 and moveable fasteners that may circulate around the rope 112. The moveable fasteners may hold goods such as a panel and may convey, via the overhead conveyor, the goods to a different position within the alternative warehouse 200. FIG. 2A shows robots that are gathered in a beginning robot position 206 to perform one or more respective tasks to help in an operation such as assembly of a vehicle. FIG. 2A shows that the overhead conveyor is positioned in a first position 204 with which the overhead conveyor is aligned with one or more of the robots that are working within the beginning robot position 206. Thus, during this alignment a good that is being transported via the overhead conveyor may extend into an arm range of movement of one or more of the robots that are positioned within the beginning robot position 206.

FIG. 2A shows that the overhead track 202 may in some embodiments include rails that run vertically and laterally within the alternative warehouse 200. Although a single left-to-right running pair of tracks is for simplicity shown in FIG. 2A, the overhead track 202 may include a series of such left-to-right running tracks distributed intermittently along the warehouse/warehouse room. Although a leading laterally running pair of tracks and an end laterally running pair of tracks are for simplicity shown in FIG. 2A, the overhead track 202 may include a series of such laterally running tracks distributed intermittently along the warehouse/warehouse room. At an upper end of each support arm, a glider may be disposed that may fit within a track rail. By gliding along the lateral and/or forward running tracks, the overhead conveyor may be moved to have essentially any orientation within the alternative warehouse 200.

Figure 2B:
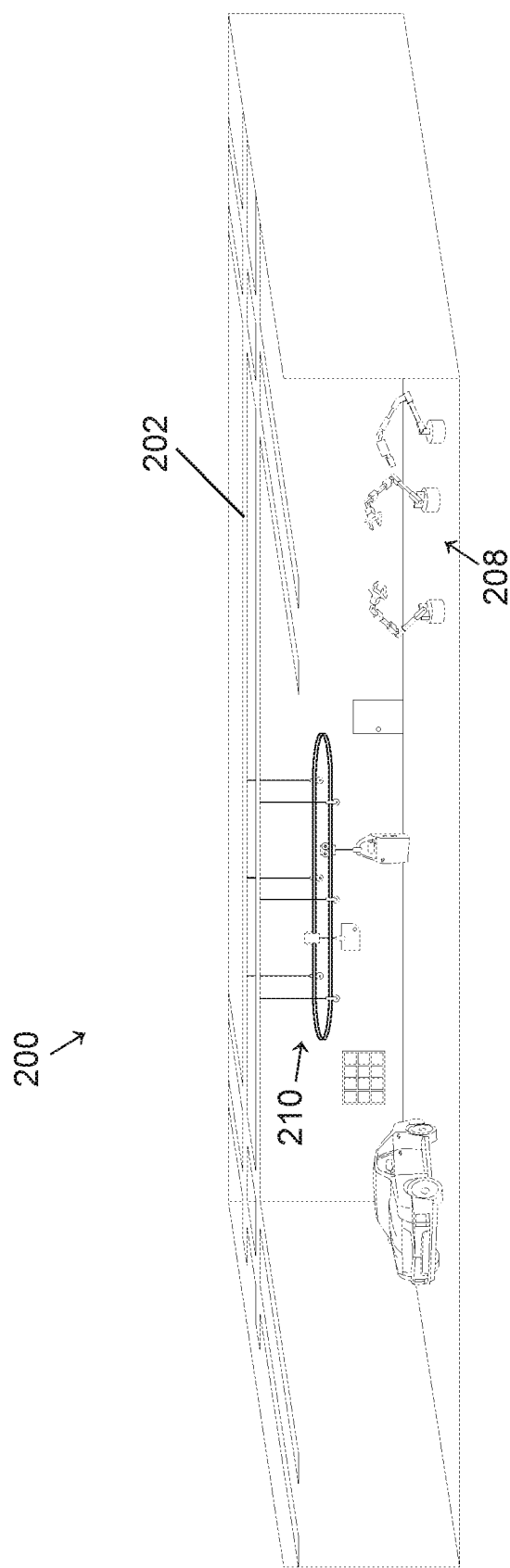
FIG. 2B illustrates the robot assistance environment and the alternative warehouse of FIG. 2A according to at least one embodiment with the working robots having moved to another position and the overhead conveyor having moved along the overhead track to a second position to approach the robots that have moved.

FIG. 2B illustrates the alternative warehouse 200 of FIG. 2A in a situation when the robots have moved to a further robot position 208 to perform other tasks. This movement of the robots may be sensed by a controller/control computer within the alternative warehouse 200. Upon sensing the movement and determining the new positions, the controller/control computer may generate and transmit an alignment plan for the overhead conveyor to move the overhead conveyor to be able to support the robots in their new position at the further robot position 208. FIG. 2B shows an instance after the alignment plan has been generated and transmitted to the control structure of the overhead track. The alignment plan included instructions for the control elements of the overhead track 202 such as a drive and/or an engine to move the overhead conveyor to be positioned near the robots at the further robot position 208. FIG. 2B shows the overhead conveyor in a second position 210 as the overhead conveyor moves along the overhead track 202 to be nearer to the further robot position 208.

Figure 2C:
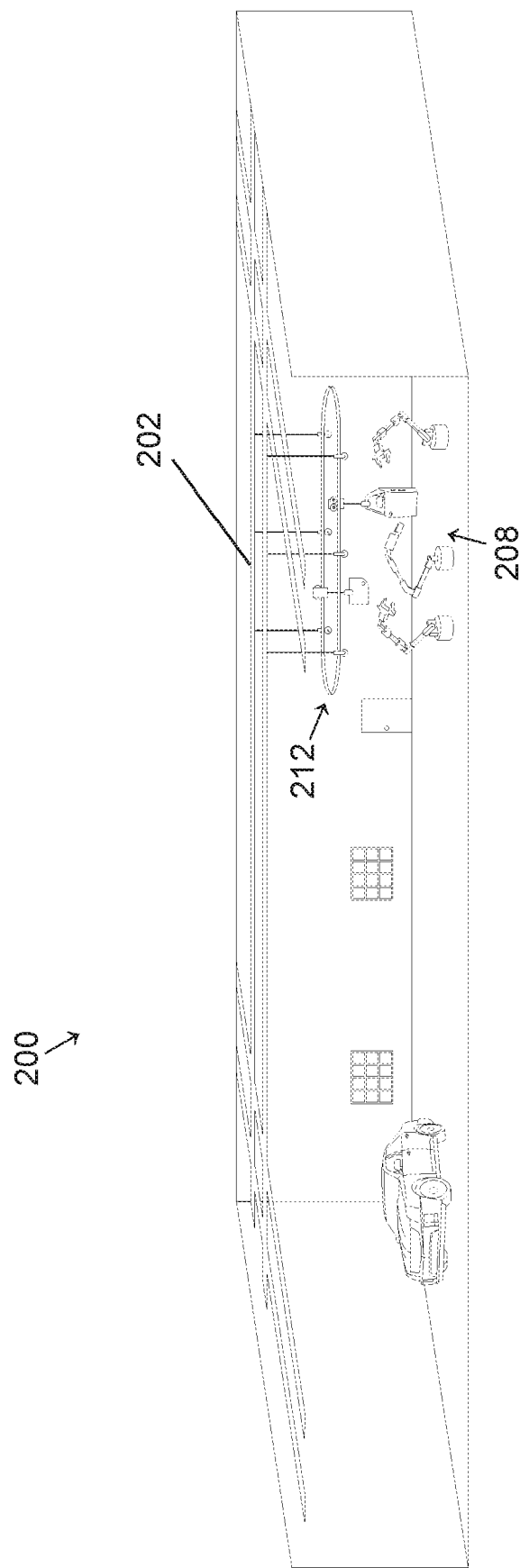
FIG. 2C illustrates the robot assistance environment and the alternative warehouse of FIGS. 2A and 2B according to at least one embodiment with the overhead conveyor having moved further along the overhead track to a conveyor adjustment position to match the position of the robots.

FIG. 2C illustrates the alternative warehouse 200 shown in FIGS. 2A and 2B with the overhead conveyor having moved further along the overhead track 202 so that the overhead conveyor is now disposed at a conveyor adjustment position 212 to be aligned with one or more of the robots that are positioned at the further robot position 208. Thus, with the overhead track 202 now in the conveyor adjustment position 212 the overhead track 202 may receive items from another area of the alternative warehouse 200 and convey these retrieved items to overlap a range of arm movement of one or more of the robots at the further robot position 208. Thus, the robots at the further robot position 208 may retrieve items from the overhead conveyor for use in performing a task.

The control computer may sense a position of the robots and as part of the alignment plan may determine a final track position where the conveyor support arms should be positioned for holding the ropeway in alignment with the robots.

The alignment plan may also include a transport plan indicating the track segments along which the support arm gliders must travel in the overhead track 202 in order to reach this position for conveyor-robot alignment.

It should be appreciated that FIGS. 2A-2C provide illustrations of some implementations and do not imply any limitations with regard to the environments in which the robot assistance system and method may be implemented. Many modifications to the depicted environments and structures may be made based on design and implementation requirements.

Figure 3A:
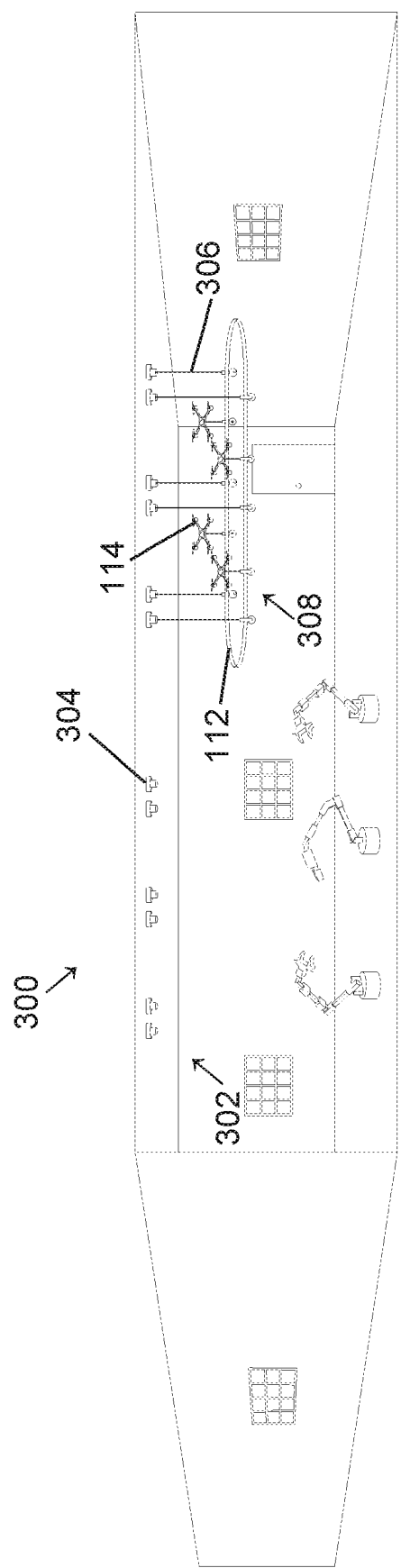
FIG. 3A illustrates a robot assistance environment for a facility which includes an insertion conveyor support system for an overhead conveyor and shows the overhead conveyor in a first position according to at least one embodiment.

FIG. 3A illustrates a facility 300 which includes an insertion conveyor support system 302 for an overhead conveyor. FIG. 3A shows the overhead conveyor in an initial conveyor position 308. The insertion conveyor support system includes coupling openings such as the first coupling opening 304 that are distributed intermittently throughout the ceiling of the facility 300. The overhead conveyor of this embodiment may include coupling bars such as the first coupling bar 306 which may be used to connect to and support the rope 112 of the overhead conveyor and extend into and be fastened by a respective coupling opening. FIG. 3A shows that a group of robots have moved into a position away from the overhead conveyor and its rope 112. Upon sensing and/or determining this movement of the robots, a control computer may generate and transmit an alignment plan for moving the overhead conveyor to be moved and thereby aligned with the robots in their new positions. In this embodiment, flying drones such as the first drone 114 may be summoned to help remove the coupling bars such as the first coupling bar 306 from the first group of coupling openings and then fly to move the overhead conveyor and the thereto attached coupling bars to be aligned with the robots at the new positions of these robots. Once the drones have moved the overhead conveyor into the aligned position, the drones may fly the coupling bars upwards and insert the coupling bars into a second group of coupling openings.

Figure 3B:
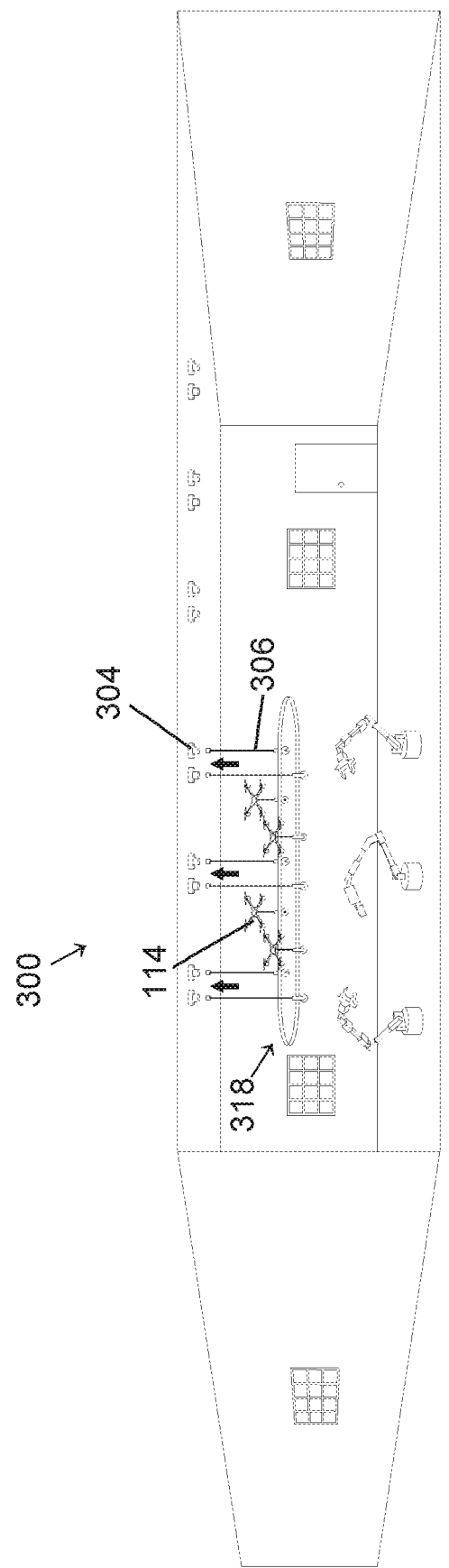
FIG. 3B illustrates the robot assistance environment and the facility with the insertion conveyor support system of FIG. 3A according to at least one embodiment with the drones having moved the overhead conveyor to match the position of the working robots and to bring the overhead conveyor to a new insertion position closer to the working robots and ready to be inserted into the insertion conveyor support system.

FIG. 3B illustrates the facility 300 that was shown in FIG. 3A with the insertion conveyor support system 302. FIG. 3B shows an instance after the drones have initially flown downwards to remove the coupling bars from the first group of coupling openings and then have flown the overhead conveyor over to be near the current robot positions and near the second group of coupling openings. Thus, FIG. 3B shows the overhead conveyor moved to an insertion approach position 318 in which the drones will continue to fly upwards so that the coupling bars are moved into the second group of coupling openings and received and secured/fastened by the coupling openings. The coupling openings may include snap fasteners which are moved back upon insertion of the coupling bars and then snapped back into place through a respective coupling hole within a respective coupling bar.

Figure 3C:
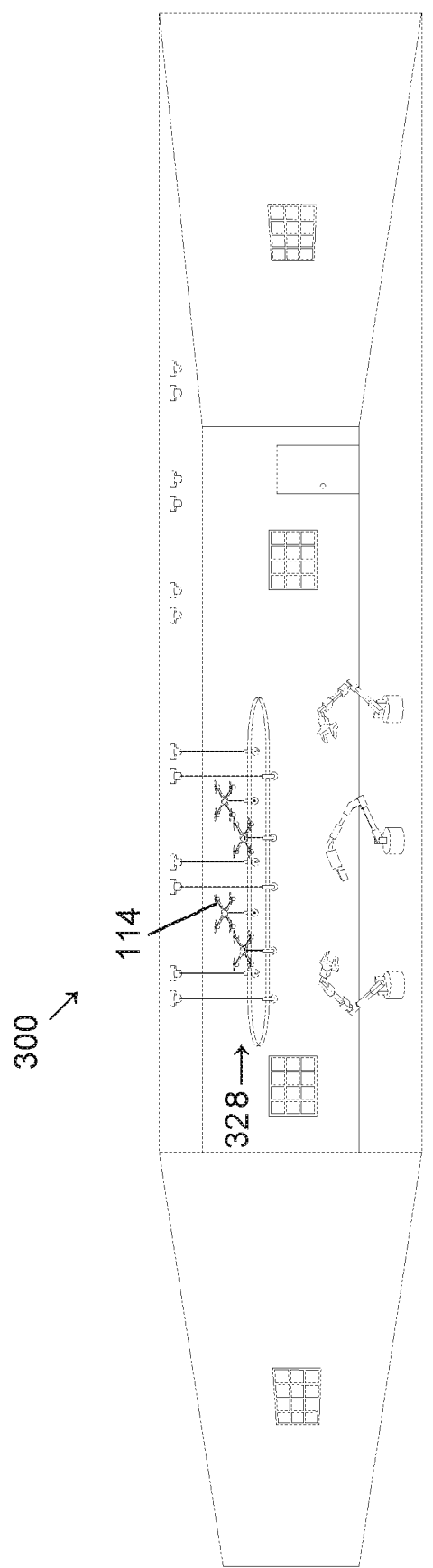
FIG. 3C illustrates the robot assistance environment and the facility with the insertion conveyor support system of FIGS. 3A and 3B according to at least one embodiment with the drones having inserted the overhead conveyor into the insertion conveyor support system so the overhead conveyor is an inserted adjustment position near the working robots.

FIG. 3C illustrates the facility 300 with the insertion conveyor support system 302 of FIGS. 3A and 3B with the drones having flown upwards, as compared to their position in FIG. 3B, to insert the coupling bars into the second group of coupling openings. Thus, the overhead conveyor is shown in FIG. 3C in an inserted attached position 328. At this inserted attached position 328, the overhead conveyor is aligned with one or more of the robots so that an item being conveyed by the overhead conveyor may be grasped by one or more of the robots within the arm range of movement of that robot. With the overhead conveyor in the inserted attached position 328, the drones may release their grips of the overhead conveyor so that the overhead conveyor is supported by the warehouse structure via the coupling openings and the warehouse ceiling that is connected to the coupling openings. Each drone in one or more of the various embodiments may include a respective gripper, claw, and/or fastener which may controllably grip and release an object such as a support arm that supports the overhead conveyor.

The control computer may sense a position of the robots and as part of the alignment plan may determine a final track position where the conveyor support arms should be positioned for holding the ropeway in alignment with the robots. The alignment plan may also include a connection opening plan indicating the new group of insertion openings into which the conveyor support arms need to be supported to support the overhead conveyor to service/be aligned with the robots in their new robot positions. The alignment plan may also include a flight path for the robots to move to the conveyor for retrieval of same from the already-connected insertion openings and for delivery of the retrieved conveyor to the new insertion openings for alignment with the newly-positioned robots.

It should be appreciated that FIGS. 3A-3C provide illustrations of some implementations and do not imply any limitations with regard to the environments in which the robot assistance system and method may be implemented. Many modifications to the depicted environments and structures may be made based on design and implementation requirements.

Figure 4A:
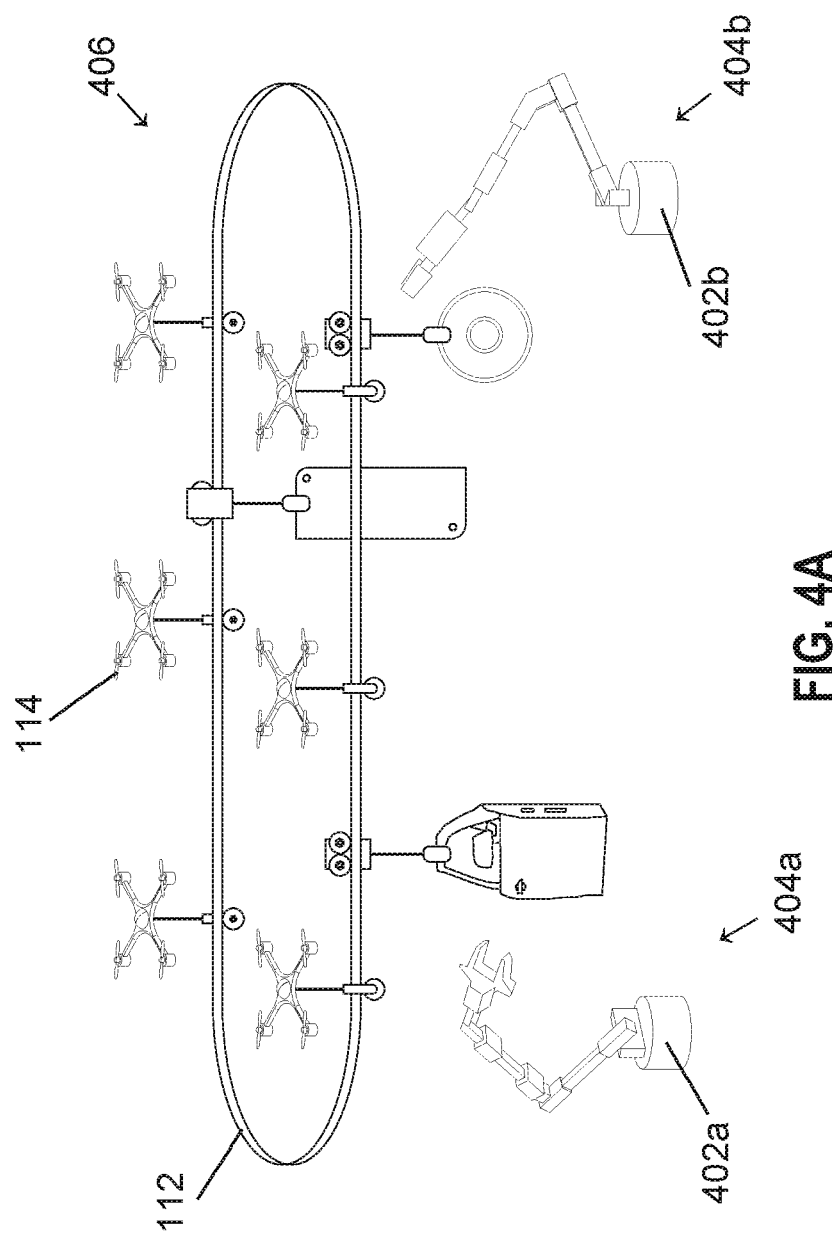
FIG. 4A illustrates a robot assistance environment according to at least one embodiment with a single multi-robot support conveyor supporting multiple robots in respective first positions.

FIG. 4A illustrates a robot assistance environment according to at least one embodiment with a single multi-robot support conveyor 406 supporting multiple robots in respective first positions. FIG. 4A shows that the single multi-robot support conveyor 406 is positioned to convey goods to both a left robot 402a and a right robot 402b. This positioning occurs for the left robot 402a while the left robot 402a is in a left robot first position 404a and occurs for the right robot 402b while the right robot 402b is in a right robot first position 404b. For this embodiment, flying drones such as the first drone 114 are flying in the air and supporting the weight of the single multi-robot support conveyor 406 and any items being carried/conveyed by the single multi-robot support conveyor 406. The single multi-robot support conveyor 406 includes rope 112 for circulating to convey goods around the path, e.g., a peripheral path, of the single multi-robot support conveyor 406.

The single multi-robot support conveyor 406 is similar to the overhead conveyors shown in FIGS. 1, 2A-2C, and 3A-3C which also support multiple robots with a single conveyor. The emphasis in FIG. 4A, however, of the overhead conveyor being a single multi-robot support conveyor 406 is done to contrast with the embodiment shown in FIG. 4B.

Figure 4B:
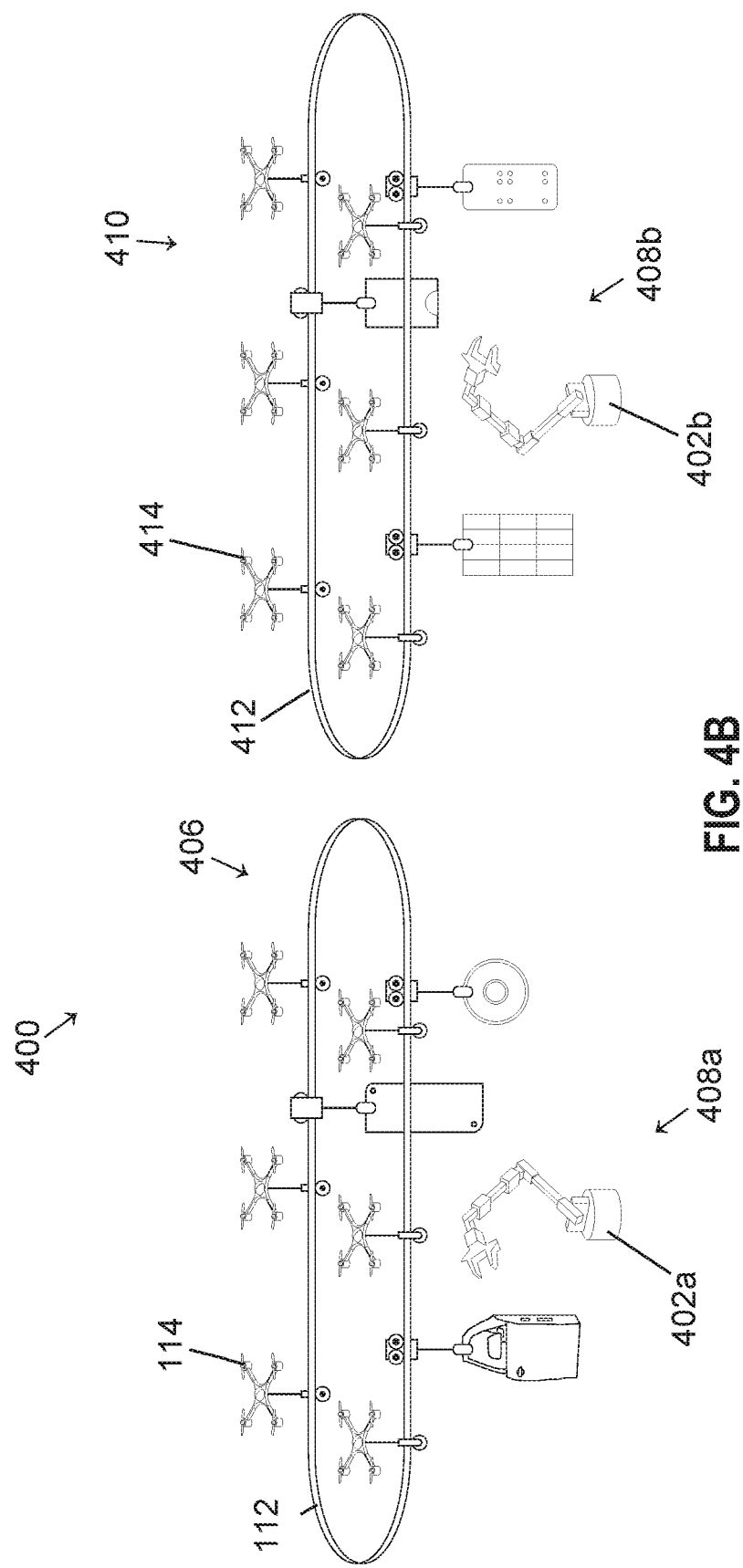
FIG. 4B illustrates a robot assistance environment with the robots of FIG. 4A having moved to adjusted positions and with a second overhead conveyor having been set up to help support the multiple robots in their adjusted positions according to at least one embodiment.

FIG. 4B illustrates a robot assistance environment which incorporates conveyor supplementing 400. In FIG. 4B, the left robot 402a and the right robot 402b of FIG. 4A have moved to adjusted positions, namely to a left robot second position 408a and a right robot second position 408b, respectively. In these further positions, the single multi-robot support conveyor 406 is less able or unable to support both the left robot 402a and the right robot 402b for conveying goods to them. These robot positioning movements were sensed and/or determined by a control computer which caused the control computer to generate a new alignment plan. The control computer determined that service of both robots via conveyors would necessitate another overhead conveyor. Thus, the alignment plan was generated and transmitted to additional drones including the second drone 414 which together grasped and delivered a second overhead conveyor 410 to align with and service the right robot 402b in its right robot second position 408b. The additional drones such as the second drone 414 grasped a support arm of the second overhead conveyor 410. The second overhead conveyor 410 included a second rope 412. The support arms of the second overhead conveyor 410 were attached to supporting structure to support the second rope 412 which may be circulated to convey goods. The original conveyor, namely the multi-robot support conveyor 406 that was shown in FIG. 4A, was used in the realignment plan for being aligned with and servicing the left robot 402a while the left robot 402a is in its left robot second position 408a further removed from the right robot 402b in the right robot second position 408b.

Thus, FIGS. 4A and 4B illustrate how the alignment plan that is generated according to the robot assistance program may in some embodiments be a realignment plan which calls for the creation of additional overhead conveyors, e.g., additional overhead ropeway conveyors, to respectively align with and service robots positioned distant from one another within a single working environment. The robot assistance program may include implementing the creation and positioning of such additional overhead conveyors for servicing multiple robots that are distanced from each other. The additional conveyor may be formed by fitting the second rope 412 into the rope supporting structure that is attached to the support arms. The additional conveyor may be positioned by having the additional drones such as the second drone 414 grasp the support arms and collectively move the second overhead conveyor 410 into an aligned position to support and service the right robot 402b that is positioned in the right robot second position 408b.

Figure 5:
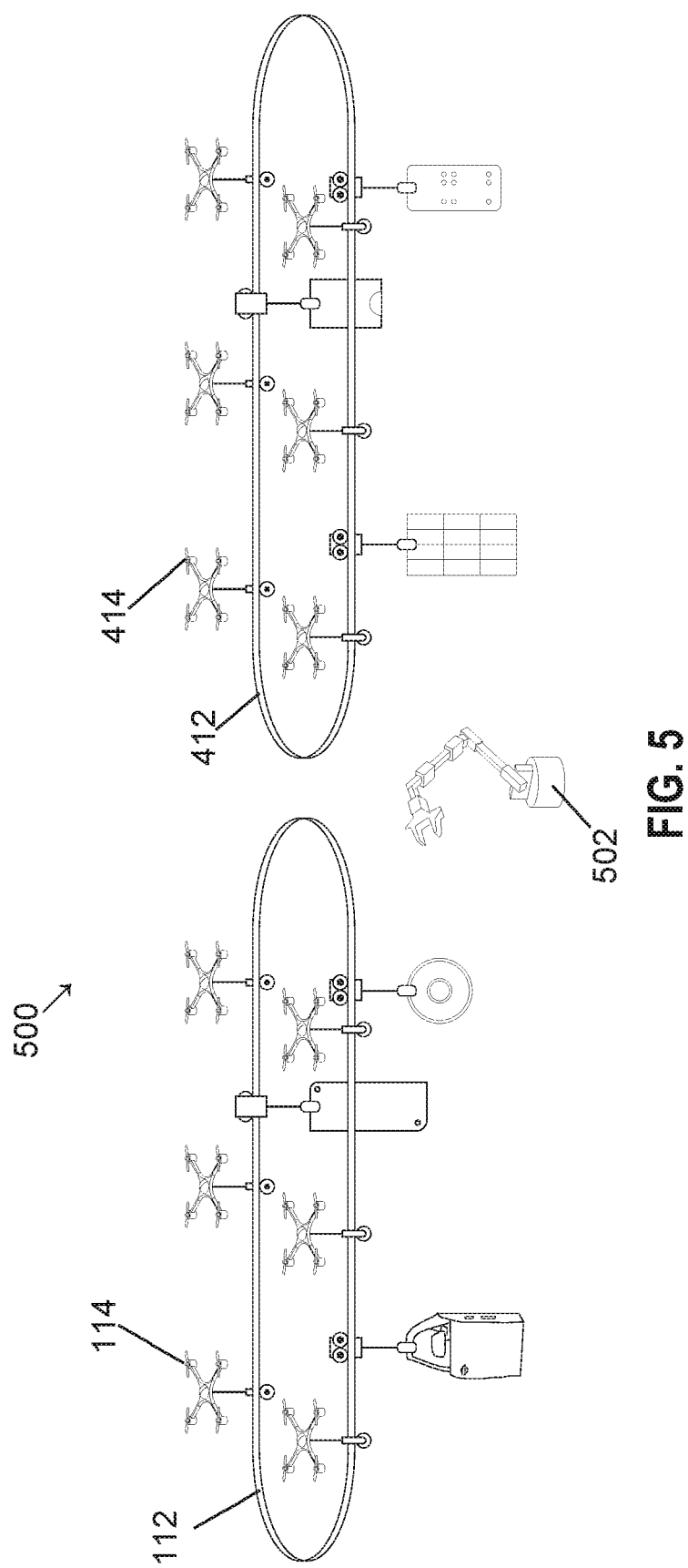
FIG. 5 illustrates a robot assistance environment according to at least one embodiment with multiple overhead conveyor support for a single robot.

FIG. 5 illustrates an embodiment which implements robot assistance by having multiple overhead conveyor support 500 for a single robot 502. In some instances, a robot such as the single robot 502 may be performing a task or multiple tasks while stationed in a single position/area. The task/tasks may require delivery of different items which may be stored at differing locations within a warehouse. Thus, a left overhead conveyor with a rope 112 and carried by drones such as the first drone 114 may be fed with goods from a first location and convey such goods to the single robot 502. Simultaneously, a right overhead conveyor with a second rope 412 and carried by drones such as the second drone 414 may be fed with goods from a second location in a warehouse and convey such goods to the single robot 502. The timing of circulation/delivery of these goods may be staggered to feed the single robot 502 at an appropriate time in the task performance so that the single robot 502 may grasp and use the object conveyed before another object from the other conveyor is delivered. A control computer may also generate and transmit a good conveying schedule which provides times for loading the overhead conveyor so that the goods will arrive within the arm range of movement of the single robot 502 when the single robot 502 is ready to retrieve and use same.

In some embodiments, the rope 112 may be a steel rope. The rope that is part of the overhead conveyor may include some slack which may be tapped into in order to change a size of the circulation path of the conveyor. To reduce the size of the circulation path, the controller may cause the size of the rope slack to be increased. The slack may exist outside of a tension point for the rope 112 in the circulation path of the items to be conveyed. The items to be conveyed may not enter into the slack area.

It should be appreciated that FIGS. 4A-4B and 5 provide illustrations of some implementations and do not imply any limitations with regard to the environments in which the robot assistance system and method may be implemented. Many modifications to the depicted environments and structures may be made based on design and implementation requirements.

Figure 6:
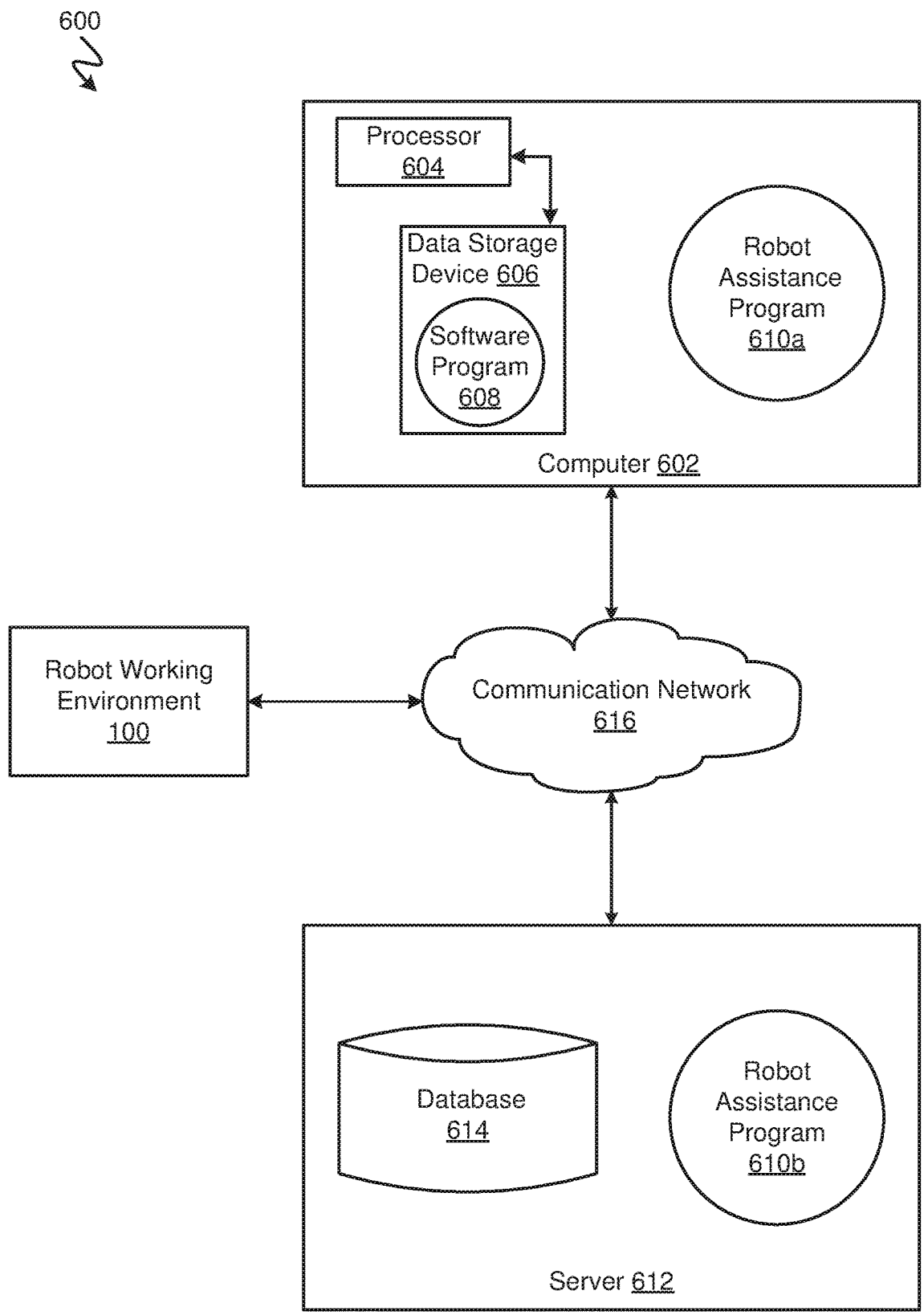
FIG. 6 illustrates a networked computer environment according to at least one embodiment.

Referring to FIG. 6, an exemplary networked computer environment 600 in accordance with one embodiment is depicted and which may include any of the robot working environments that are depicted in FIGS. 1A-5. The networked computer environment 600 may include a computer 602 with a processor 604 and a data storage device 606 that is enabled to run a software program 608 and a robot assistance program 610a. The networked computer environment 600 may also include a server 612 that is a computer and that is enabled to run a robot assistance program 610b that may interact with a database 614 and a communication network 616. The server 612 may include a plurality of machine learning modules and/or may use the communication network 616 to access other servers which host machine learning models. The networked computer environment 600 may include a plurality of computers 602 and servers 612, although only one computer 602 and one server 612 are shown in FIG. 6. The communication network 616 allowing communication between the computer 602 and the server 612 may include various types of communication networks, such as the Internet, a wide area network (WAN), a local area network (LAN), a telecommunication network, a wireless network, a public switched telephone network (PTSN) and/or a satellite network.

It should be appreciated that FIG. 6 provides only an illustration of one implementation and does not imply any limitations with regard to the environments in which different embodiments may be implemented. Many modifications to the depicted environments may be made based on design and implementation requirements.

The computer 602 may communicate with the server 612 via the communication network 616. Individual robots within the robot assistance environment 100 may also communicate with the client computer 602 and/or the server 612 via the communication network 616. The communication network 616 may include connections such as wire, wireless communication links, and/or fiber optic cables. As will be discussed with reference to FIG. 8, server 612 may include internal components 802a and external components 804a, respectively, and computer 602 may include internal components 802b and external components 804b, respectively. Server 612 may also operate in a cloud computing service model, such as Software as a Service (SaaS), Platform as a Service (PaaS), or Infrastructure as a Service (IaaS). Server 612 may also be located in a cloud computing deployment model, such as a private cloud, community cloud, public cloud, or hybrid cloud. Computer 602 may be, for example, a mobile device, a telephone, a personal digital assistant, a netbook, a laptop computer, a tablet computer, a desktop computer, an embedded system, or any other type of computing devices capable of running a program, accessing a network, and accessing a database 614 in a server 612 that is remotely located with respect to the computer 602. The computer 602 may be mobile and may include a display screen and a camera. According to various implementations of the present embodiment, the robot assistance program 610a, 610b may interact with a database 614 that may be embedded in various storage devices, such as, but not limited to a computer/mobile device 602, a networked server 612, or a cloud storage service.

As will be discussed with reference to FIG. 8, the server 612 may include internal components 802a and external components 804a, respectively. The computer 602, the controller 140, and interior computers of the various robots of the robot assistance environment 100 such as the first robot 102a shown in FIG. 1 may also each include internal components 802b and external components 804b as depicted in FIG. 6. Server 612 may also operate in a cloud computing service model, such as Software as a Service (SaaS), Platform as a Service (PaaS), or Infrastructure as a Service (IaaS). Server 612 may also be located in a cloud computing deployment model, such as a private cloud, community cloud, public cloud, or hybrid cloud. The computer 602 and the controller 140 may be, for example, a mobile device, a telephone, a personal digital assistant, a netbook, a laptop computer, a tablet computer, a desktop computer, an embedded system, or any type of computing devices capable of running a program, accessing a network, and accessing a database 614 in a server 612 that is remotely located with respect to the computer 602. The computer 602, the controller 140, and computers of the robots and/or drones may each include a display screen, a speaker, a microphone, a camera, and a keyboard or other input device for receiving output and providing input to the respective computer. According to various implementations of the present embodiment, the robot assistance program 610a, 610b may interact with a database 614 that may be embedded in various storage devices, such as, but not limited to a various computers/mobile devices, a server 612 that may be in a network, or another cloud storage service. The controller 140 may also include an instance of the robot assistance program for generating an alignment plan for aligning a conveyor with a robot.

The robot assistance program 610a, 610b may be used to generate an alignment plan based on various warehouse inputs that are received. The robot assistance program 610a, 610b may then transmit the alignment plan to receiver components of computers that are on-board the drones or other conveyor support structure to carry out aligning the conveyor with the robots. In some embodiments, a robot or a drone will host a central computer which generates the alignment plan and then communicates instructions to receivers of computers on the drones or other conveyor support structure. Thus, in this embodiment such central computer on one of the robots or drones may replace or supplement the controller 140.

The robot assistance program 610a, 610b may also generate and transmit an alignment plan, progress, and approval messages to be transmitted to another computer for review and/or approval of an administrator and/or manager of the robot assistance environment 100, e.g., of a warehouse. In some embodiments, the robot assistance program 610a, 610b may require approval from an administrator before authorizing the drones and/or conveyor support structure carry out the conveyor alignment with the robots or to try a technique, orientation, or position of conveyor positioning which has not previously been completed and/or attempted at this facility. For example, an alignment plan generated at the controller 140, at a robot computer of the first robot 102a, and/or at the server 612 may be sent via the communication network 616 to a manager at the computer 602 for approval of the alignment plan. A machine learning model may determine whether the alignment plan constitutes a new or previously unused configuration that should be reviewed by a manager. If the machine learning model outputs that the proposed alignment plan exceeds a threshold of uniqueness, the robot assistance program 610a, 610b may in an automated manner generate and transmit a message to an administrator to request authorization to implement the proposed alignment plan.

Figure 7:
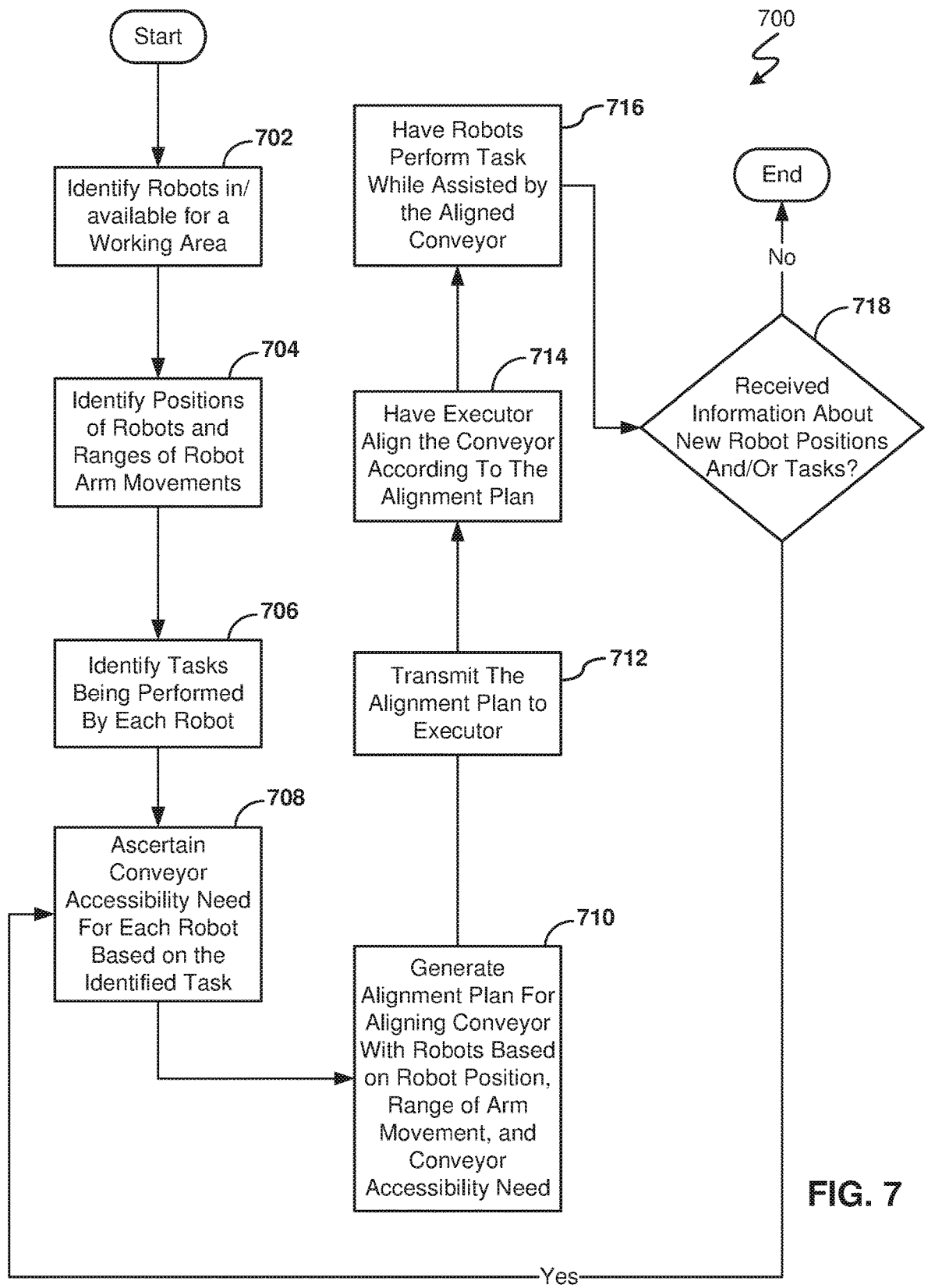
FIG. 7 is an operational flowchart illustrating a robot assistance process according to at least one embodiment.

Referring now to FIG. 7, an operational flowchart depicts a robot assistance process 700 that may, according to at least one embodiment, be performed using the robot assistance program 610a, 610b and the various components and conveyors shown in the robot working environments shown in FIGS. 1A-5. The robot assistance program 610a, 610b may include various modules, user interfaces, and services, and may use data storage when the robot assistance process 700 is performed.

In a step 702 of the robot assistance process 700, robots that are in and/or available for a working area are identified. The working area may include a warehouse, a factory that has one or more assembly lines and/or stations, and/or a machine shopfloor. The robots may include robots such as the first robot 102a, the second robot 102b, the third robot 102c, and the fourth robot 102d that are shown in FIG. 1A. The identification may occur via a controller 140 in the vicinity of the working area. The controller 140 may include a computer and one or more sensors such as a camera in order to identify robots in the working area. The controller 140 may also include a robot database which may manually be updated by a manager of the working area in order to input the robots that are available for usage at the robot assistance environment 100. The robots may include a respective global navigational signal responder which generates a global navigational signal which may be sensed by a global navigational signal receiver at the controller 140. The controller 140 may include a passive and/or active sonar sensor to recognize the presence of robots in the working environment.

This information may be received in step 702 by a user uploading the information into a computer such as the computer 602. The information may be uploaded at another computer and transmitted via the communication network 616 to the computer 602, to the controller 140, and/or to one of the robots and/or drones.

In some embodiments, one or more robots and/or drones may maneuver around the robot assistance environment 100 and use an attached scanner and/or camera and/or sonar sensor to gather the information about the working environment and robots within the working environment as a part of step 702.

In a step 704 of the robot assistance process 700, positions of the robots and ranges of robot arm movements are identified. These positions and ranges of robots identified in step 704 may be for those robots which are identified in step 702. The positions may be identified by analyzing one or more sensor signals that are received in step 702 to identify the presence of the robots. Each robot may include one or more robot arms with a respective arm range of movement. The arm range of movement may be a three-dimensional range as the arm may be able to move in a vertical, horizontal lateral, and/or horizontal forward direction. The arm may be able to rotate and may have multiple, e.g., six, degrees of freedom. FIG. 1A shows a first arm range of movement 103 for the arm of the first robot 102a. The range of movement indicates the three-dimensional space in which the robot arm may reach when the robot arm is expanded and/or stretched to a maximum distance/length. The controller 140 may be able to sense a position of a base of the respective robot, obtain and use a dimensional design plan of the particular robot, and calculate the range of movement for the robot arm based on the robot base position and on the dimensional design plan of the particular robot. Step 704 may also include a sensor such as a camera or a global navigational signal receiver identifying a position of the respective arms of the robots and a size of the arms in order to calculate the arm range of movements. The robot assistance program 610a, 610b may include a comparator so that a size of a known physical element in the image data may be compared with the image of the arm to determine the arm size based on an image size comparison.

In a step 706 of the robot assistance process 700, tasks that are being performed by each robot are identified. The robots whose tasks are identified in step 706 may be those robots identified in step 702 and whose positions were identified in step 704. Each robot may be performing a task in an assembly line. This information may be received in step 706 by a user uploading the information into a computer such as the computer 602. The information may be uploaded at another computer and transmitted via the communication network 616 to the computer 602, to the controller 140, and/or to one of the robots and/or drones. This information may also be received by capturing sensor signals about movements of the drones and inputting those sensor signals into a machine learning model that as output classifies what type of task is being performed by the robot. The machine learning model may be hosted at the controller 140, at the robot assistance program 610a in the computer 602, in the robot assistance program 610b in the server 612, and/or in some other remote server or computer. In one example, the robot may attach a part to a product as part of product assembly. In another example, a robot may retrieve an object from a conveyor and place the object on a storage shelf. In FIG. 1C, the third robot 102c may retrieve a second door 104b from the overhead ropeway conveyor 110 and attach the second door 104b to the opening in the partially-assembled vehicle 120.

In a step 708 of the robot assistance process 700, a conveyor accessibility need for each robot is ascertained based on the identified task. The identified task that is used in step 708 to ascertain a conveyor accessibility need for a robot refers to the task that was identified for each robot in step 706. A machine learning model may be used to ascertain a conveyor accessibility need for each robot. The machine learning model may be trained with supervised training which inputs materials to be used by a robot while performing a specified task. For example, if a robot is performing the task of attaching a car door to a vehicle on an assembly line then conveyor accessibility needs for the robot may include receiving the door itself delivered by the conveyor, receiving bolts or other fasteners needed to fasten the door to the vehicle chassis, and/or receiving an occasional attachment tool such as a hammer if the hammer becomes broken. If the task of adding the car door is the identified task of a robot and is input into this machine learning model, the machine learning model may output one or more of these items as needing to be provided by the conveyor. The machine learning model may be disposed in the controller 140, in the robot assistance program 610a of the computer 602, in the robot assistance program 610b of the server 612, and/or in another computer or server in another location that is accessible via the communication network 616. The conveyor accessibility need may also take into account a size of the object that is needed and thereby the extension of the object from the overhead conveyor and/or from the fastener of the overhead conveyor as the object is being transported by the overhead conveyor. For an object which extends further away from the overhead conveyor during transport, a robot may need to have less of a reach and the overhead conveyor can be positioned further from the robot. For an object which has a smaller extension from the overhead conveyor during transport, a robot may need to reach more closely to the overhead conveyor in order to retrieve the object from the overhead conveyor, and the overhead conveyor must be positioned more closely to the robot.

In a step 710 of the robot assistance process 700, an alignment plan for aligning the conveyor with the robots is generated based on the robot position, the range of arm movement, and the conveyor accessibility need. Thus, the alignment plan that is generated in step 710 may use information identified or determined in steps 702, 704, 706, and 708 of the robot assistance process 700. The alignment plan may be generated via a machine learning model which takes one, some, or all of the above-mentioned inputs and outputs the alignment plan. The alignment plan may include a length for how much distance the conveyor needs to run within the range of arm movement of each robot. The alignment plan may include an angle and/or an inclination for the conveyor as the conveyor runs through and/or intersects the arm range of movement of each robot. In instances when the alignment plan helps with collaboration with the tasks of multiple robots within a single working area, the alignment plan may in some instances recommend/require a movement of one or more robots so that the arm range of movement of the corresponding robot arm may be changed and better integrated with the requirements of the other robots and the conveyor path within the working environment. This robot movement may be implemented in embodiments with mobile robots. Other embodiments with robots with static bases may depend on movement of the conveyor.

The alignment plan may include positions for the drones in the air which are holding conveyor support structure such as the support arm 118. Moving the positions of the drones may cause the conveyor path of the conveyor to change. In other embodiments where the conveyor is supported by connections to the ceiling in addition to or in alternative to the drones, the alignment plan may include positions for the support arms to be moved in the ceiling connection structure. This movement may be along a track such as the overhead track 202 shown in FIGS. 2A-2C. This movement may be to different groups of coupling openings such as those that are shown in FIGS. 3A-3C. Moving the positions of the support arms to be connected to the ceiling structure at a different location or to glide along an overhead track may cause the conveyor path of the conveyor to change. Other hanger bars and/or hanging mechanisms may help support an overhead conveyor in some embodiments. The robot assistance program 610a, 610b may also use mathematical calculations as part of the machine learning model for designing the alignment plan. The alignment plan may also take into account a storage position for items within a warehouse that may need to be transported to the robots during the robot work task. A beginning segment of the conveyor may need to overlap such a storage region, so that these items may be loaded onto the conveyor at the beginning segment of the conveyor. The end segment or an intermediate segment of the conveyor may need to be positioned near a respective robot working position so that a respective robot may be able to retrieve an item from the conveyor as the conveyor circulates and conveys attached items.

The alignment plan may be generated to update paths for multiple conveyors within the working environment. The alignment plan may allow a single robot to be delivered objects from different conveyors at a staggered time so that the robot may grab a first object from a first conveyor, use the first object, then, with the same arm, grab a second object from a second conveyor, and then use the second object for the task. FIG. 5 illustrates an example of such an embodiment. The alignment plan may allow multiple conveyors to simultaneously deliver respective objects to multiple robots as is shown in the embodiment of FIG. 4B. The machine learning model may be able to generate a complex alignment plan which helps the one or more robots achieve a complex task, e.g., a complex product assembly.

The alignment path may also take into account a loading zone of the conveyor where a tray, a fastener, and/or the conveyor itself may receive a part/item that is to be delivered/conveyed to the robots. In many instances the conveyor must necessarily pass through the loading zone so that the conveyor is positioned to receive the object to be delivered.

The alignment plan may also include a material flow of direction of the circulating portion, e.g., the rope 112, of the overhead conveyor. On a repeat of step 710 as may be explained subsequently, a direction of flow of the circulating portion may be reversed based on changing positions of robots and different conveyor accessibility needs. Thus, a circulation may change from clockwise circulation to counter-clockwise circulation or vice-versa.

In a step 712 of the robot assistance process 700, the alignment plan is transmitted to an executor. This alignment plan that is transmitted in step 712 may be the alignment plan that was generated in step 710. The executor may be a drone such as the first drone 114 shown in FIGS. 1A-1C and in FIGS. 3A-3C. The executor may be a control computer of a drive of an overhead track such as the overhead track 202 shown in FIGS. 2A-2C. In such embodiment the executor may also include the overhead track 202 and support arms that are movably secured within rails of the overhead track 202. The control computer may drive support arms that are movably secured within rails of the overhead track 202 in order to move the position of an overhead conveyor. This transmission of step 712 may occur to multiple executors such as to multiple drones. The executor may be another computer within the warehouse so that a warehouse worker can read the instructions to be prepared for manually moving the positions of the conveyor support structure. The support arms may in some embodiments be metal support arms.

For those embodiments in which a control computer with one of the drones generates the alignment plan, this transmission may occur within the drone and from the interior control computer of the drone to one or more other computers within the same drone for moving the arms and wings of the drone to carry out movement of the drone and conveyor carried by the drone according to the alignment instructions. When multiple drones are to be involved in the robot assistance process 700, a lead drone, e.g., the first drone 114, with a control computer may transmit the instructions in a message via the communication network 616 to the one or more other drones.

The alignment plan may also be based off the type of robot with which the conveyor is to be aligned. Different robots may require different conveyor angles and/or elevation. In some embodiments, support arms holding the overhead conveyor upwards may be extended or decreased to adjust an elevation and/or angle of the conveyor path. In some embodiments, flying drones supporting the overhead conveyor upwards may be instructed to increase or decrease their elevation in order to adjust an elevation and/or angle of the conveyor path.

In a step 714 of the robot assistance process 700, the executor aligns the conveyor according to the alignment plan. This executor that performs the conveyor alignment may be the executor that received the alignment plan in step 712. In some embodiments, the executor is a drone which holds support structure for supporting the conveyor. In other embodiments, an overhead track may additionally and/or alternatively move the conveyor support structure.

In a step 716 of the robot assistance process 700, the robots perform their task while being assisted by the aligned conveyor. This aligned conveyor may be the conveyor that was aligned in step 714 via the executor. The robots may be those whose positions were identified in step 704. In FIG. 1A, the third robot 102c may retrieve from the overhead ropeway conveyor 110 a second door 104b for the partially-assembled vehicle 120 to add to the partially-assembled vehicle 120. The first robot 102a may retrieve this piece from a fastener of the overhead ropeway conveyor 110 as the overhead ropeway conveyor 110 and/or the fastener passes through the respective arm range of movement of the third robot 102c. Other robots within the same working environment may perform the same task as the first robot 102a for a different assembly line or may perform a different task than the first robot 102a for the same assembly line. The other robots may attach a similar piece that the first robot 102a attaches but at a different location of the product that is being assembled.

In a step 718 of the robot assistance process 700, a determination is made whether information is received about new robot positions and/or tasks.

If the determination of step 718 is affirmative that information is received about new robot positions and/or tasks, the robot assistance process 700 returns to step 708 to newly ascertain what the conveyor accessibility need is for each robot. The new robot positions and/or tasks may have produced a different conveyor accessibility need for one or more of the working robots. After the repeat of step 708, steps 710, 712, 714, and 716 may then be repeated. The aligned conveyor may be realigned using a new alignment plan that is generated in the repeat of step 710. The realignment plan may be referred to as a conveyor repositioning plan.

If the determination of step 718 is negative and no information is received about new robot positions and/or tasks, the robot assistance process 700 may end.

The alignment plan that is produced by a computer in step 710 for an executor to align a conveyor with the robots may in some embodiments incorporate considerations of gravitational forces that may be necessary for items and trays to move along the aligned conveyor. Although a motor may be present in the robot assistance environment 100 to power circulation of the rope 112 and thereby circulation of objects connected directly or indirectly to the rope 112, in some instances relying on gravitational forces may allow motor power to be reduced or redirected toward other areas.

A choice of conveyor that is implemented and to be aligned by the one or more executors may also depend on physical characteristics such as size of the objects that are to be conveyed. Some parts with consistent cuboid shapes may match a conveyor type that has two rails. Other parts may be better suited for a movable platform track type, e.g., that includes a conveyor belt. Other items may be better suited for conveyance via an overhead ropeway conveyor. The machine learning model(s) may account for this information, e.g., in step 710.

The alignment plan may also incorporate the calculation of determining the shortest possible material movement path for the conveyor between two positions, e.g., between a conveyor loading point for a transported good and a robot engagement/interaction point of the conveyor. This implementation with the shortest distance may decrease an overall time required to move an object or a group of objects.

When the movement for an object or a group of objects is finished and no other objects are ready to be moved along the conveyor, a conveyor motor may reduce its power and/or turn off so that the movement conveyor is not moving.

Any machine learning model used for various steps of the robot assistance process 700 including the generation of the alignment plan or realignment plan in step 710 may include naive Bayes models, random decision tree models, linear statistical query models, logistic regression n models, neural network models, e.g. convolutional neural networks, multi-layer perceptrons, residual networks, long short-term memory architectures, algorithms, deep learning models, and other models. The one or more machine learning models may be trained. The process of training a machine learning model may include providing training data to a learning algorithm or to a machine learning algorithm. The machine learning model is the model structure or system that is created by the training process. The training data should include targets or target attributes which include a correct answer. Training data for the present embodiments may include similar information for other warehouses and/or facilities and appropriate track plans and tracks that were generated for transporting goods in those other warehouses. The learning algorithm finds patterns in the training data in order to map the input data attributes to the target. The machine learning model contains these patterns so that the answer can be predicted for similar future inputs. A machine learning model may be used to obtain predictions on new data for which the target is unknown. The machine learning model uses the patterns that are identified to determine what the target is for new data without a given answer. Training may include supervised and/or unsupervised learning.

Various commercial platforms exist to allow a machine learning model to be created or trained. The training may include selecting data types, uploading data, selecting class types, and allowing a commercial system to then train the data. Such data upload may occur at the computer 602 or at another computer associated with the server 612. The machine learning model that is generated may be stored on computer 602 or on the server 612 or on another external server accessible to the computer 602 and to the server 612 via the communication network 616. The automated design of the alignment plan for the conveyor may be performed via a machine learning model on the device or in the cloud. Using a machine learning model on the device, e.g., on a computer that is within one of the drones or on the controller 140, helps reduce data transmission required between the device, the drones, and a server in the cloud. Such a mobile machine learning model may be performed using inference-based machine learning models such as TensorFlow® Lite (TensorFlow® and all TensorFlow®—based trademarks and logos are trademarks or registered trademarks of Google, Inc. and/or its affiliates).

The robot assistance process 700 may be implemented for a working environment which includes multiple conveyors and/or tracks. The alignment plan generated may account for the location and paths of other tracks in the working environment.

In some embodiments, a conveyor realignment may occur on the basis of the controller 140 sensing that some malfunction or break has occurred and that the robot will need a spare part to correct the malfunction/breakage. The realignment plan that is generated for this purpose may be needed for a one-time delivery of the spare part to the robot. The robot assistance process 700 may be invoked in this instance even to fulfill a one-time or infrequent spare parts delivery to a robot which may save on human costs that are needed in the working environment.

In some embodiments, the controller 140 may as part of an update alter a travel path of a conveyor based on the needs of the robots. For example, instead of a conveyor conveying in a clockwise rotational path, the drive of the conveyor may according to an alignment/realignment plan be reversed to have the conveyor convey in a counter-clockwise rotational path.

The robot assistance program 610a, 610b may optimize the conveyor position with respect to the position of the robots. The robot assistance program 610a, 610b may also change the conveyor position based on position changes of the robots during the task performance by the robots.

This robot assistance process 700 may achieve dynamic changing of a conveyor path in order to suit the needs of the robots to which goods are being delivered by the conveyor. The conveyor that is dynamically changed may be positioned overhead in a working environment while other tracks/conveyors work at a ground floor level in the same working environment. For the embodiments with a ropeway overhead conveyor, the rope may for example be a steel rope and/or a nylon rope. The support arms may be rods such as steel rods. The robots may be working to assemble a big ship. The robots may be working in disaster recovery. The spare parts are typically for a task being performed by the robot but may also be for a spare part for a robot for example when one robot is repairing itself or another robot. An overhead conveyor helps avoid issues with floor traffic in a crowded working environment. The conveyor could pass multiple items that are the same or different items. Different items may be conveyed via the conveyor when multiple robots within one environment are performing different tasks than the other robots and, therefore, need different items to complete their respective tasks. One, some, or all of the robots may include a gripper at the end of their arm.

The conveyor may be reprofiled if the robots move positions. For example, if the first robot 102a, the second robot 102b, and the third robot 102c perform a first respective task at a respective first position for a respective first amount of time and then after a completion of that task or of a sub-part of the task may change to a different task or sub-task which requires movement of the robots to a different position. The robot assistance process 700 may be used to then change the profile of the conveyor in order to meet the good-delivery needs of the robots at their new positions. In some embodiments, a realignment plan may include changing a number of conveyors which are helping to convey to the same number of robots. A change in positions of the robots may necessitate the conveyor realignment and the generation of a realignment plan.

It may be appreciated that FIG. 7 provides an illustration of some embodiments and does not imply any limitations with regard to how different embodiments may be implemented. Many modifications to the depicted embodiment(s), e.g., to a depicted sequence of steps, may be made based on design and implementation requirements. Steps and features from the various processes may be combined into the other processes that are described in other drawings or embodiments.

Figure 8:
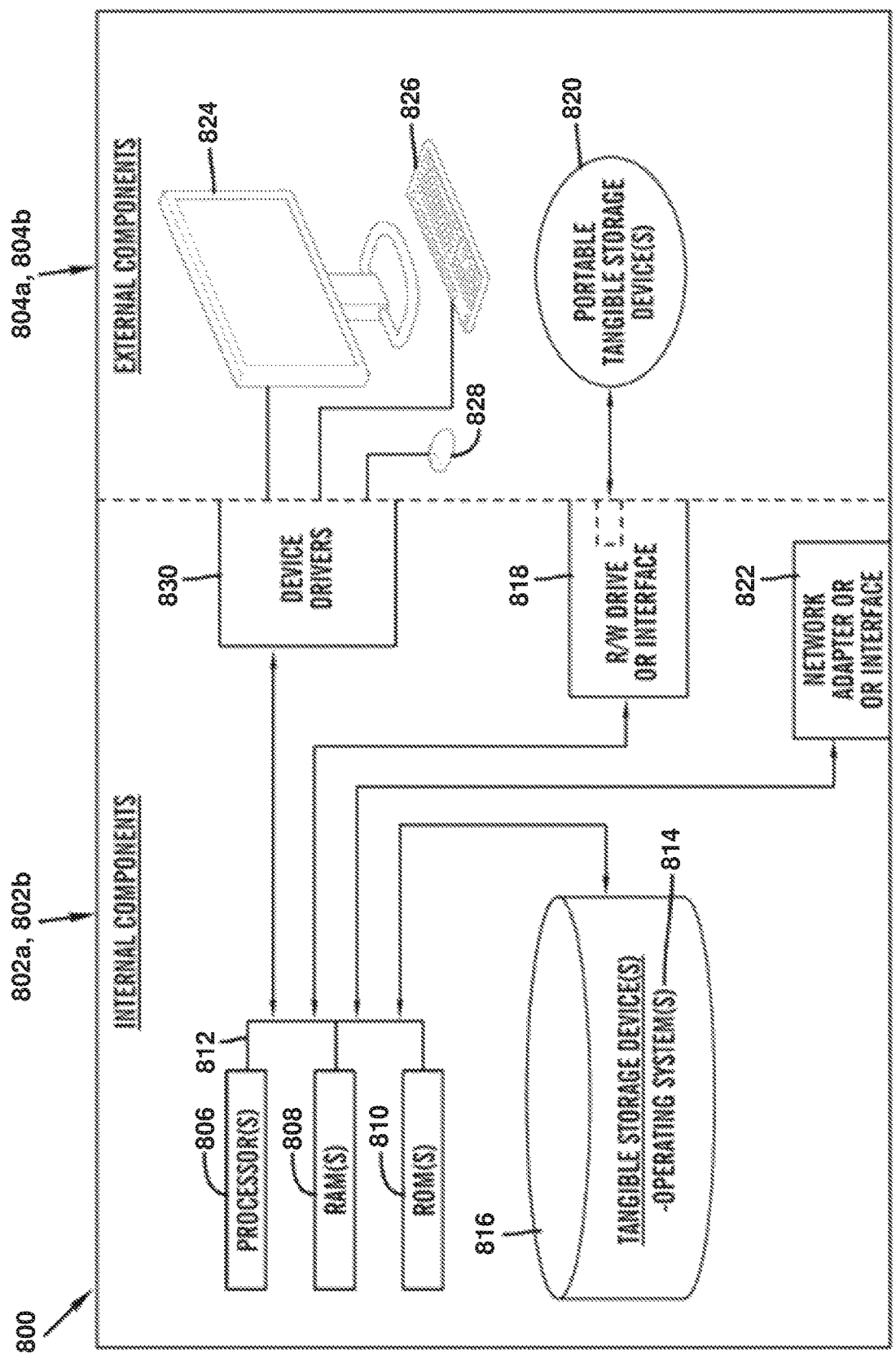
FIG. 8 is a block diagram of internal and external components of computers and servers depicted in FIG. 6 according to at least one embodiment.

FIG. 8 is a block diagram 800 of internal and external components of computers depicted in FIGS. 1-6 in accordance with an illustrative embodiment of the present invention. It should be appreciated that FIG. 8 provides only an illustration of one implementation and does not imply any limitations with regard to the environments in which different embodiments may be implemented. Many modifications to the depicted environments may be made based on design and implementation requirements.

Data processing system 802a, 802b, 804a, 804b is representative of any electronic device capable of executing machine-readable program instructions. Data processing system 802a, 802b, 804a, 804b may be representative of a smart phone, a computer system, PDA, or other electronic devices. Examples of computing systems, environments, and/or configurations that may represented by data processing system 802a, 802b, 804a, 804b include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

The computer 602, the server 612, the controller 140, and any other computer of the various robots and/or drones in the robot assistance environment 100 may include respective sets of internal components 802a, 802b and/or external components 804a, 804b illustrated in FIG. 8. Each of the sets of internal components 802a, 802b includes one or more processors 806, one or more computer-readable RAMs 808 and one or more computer-readable ROMs 810 on one or more buses 812, and one or more operating systems 814 and one or more computer-readable tangible storage devices 816. The one or more operating systems 814, the software program 608 in the computer 602, the robot assistance program 610a in the computer 602, and the robot assistance program 610b in server 612 may be stored on one or more computer-readable tangible storage devices 816 for execution by one or more processors 806 via one or more RAMs 808 (which typically include cache memory). In the embodiment illustrated in FIG. 8, each of the computer-readable tangible storage devices 816 is a magnetic disk storage device of an internal hard drive. Alternatively, each of the computer-readable tangible storage devices 816 is a semiconductor storage device such as ROM 810, EPROM, flash memory, or any other computer-readable tangible storage device that can store a computer program and digital information.

Each set of internal components 802a, 802b also includes a R/W drive or interface 818 to read from and write to one or more portable computer-readable tangible storage devices 820 such as a CD-ROM, DVD, memory stick, magnetic tape, magnetic disk, optical disk or semiconductor storage device. A software program, such as the software program 608 and the robot assistance program 610a, 610b can be stored on one or more of the respective portable computer-readable tangible storage devices 820, read via the respective R/W drive or interface 818 and loaded into the respective hard drive, e.g., the tangible storage device 816.

Each set of internal components 802a, 802b may also include network adapters (or switch port cards) or interfaces 822 such as a TCP/IP adapter cards, wireless wi-fi interface cards, or 3G, 4G, or 5G wireless interface cards or other wired or wireless communication links. The software program 608 and the robot assistance program 610a in the computer 602 and/or in one of the robots or controller 140 and the robot assistance program 610b in the server 612 can be downloaded from an external computer (e.g., server) via a network (for example, the Internet, a local area network or other, wide area network) and respective network adapters or interfaces 822. From the network adapters (or switch port adaptors) or interfaces 822, the software program 608 and the robot assistance program 610a in the computer 602 and the robot assistance program 610b in server 612 are loaded into the respective hard drive, e.g., the tangible storage device 816. The network may include copper wires, optical fibers, wireless transmission, routers, firewalls, switches, gateway computers and/or edge servers.

Each of the sets of external components 804a, 804b can include a computer display monitor 824, a keyboard 826, and a computer mouse 828. External components 804a, 8044b can also include touch screens, virtual keyboards, touch pads, pointing devices, and other human interface devices. Each of the sets of internal components 802a, 802b also includes device drivers 830 to interface to computer display monitor 824, keyboard 826 and computer mouse 828. The device drivers 830, R/W drive or interface 818 and network adapter or interface 822 include hardware and software (stored in storage device 816 and/or ROM 810).

The present invention may be a system, a method, and/or a computer program product at any possible technical detail level of integration. The computer program product may include a computer readable storage medium (or media) having computer readable program instructions thereon for causing a processor to carry out aspects of the present invention The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
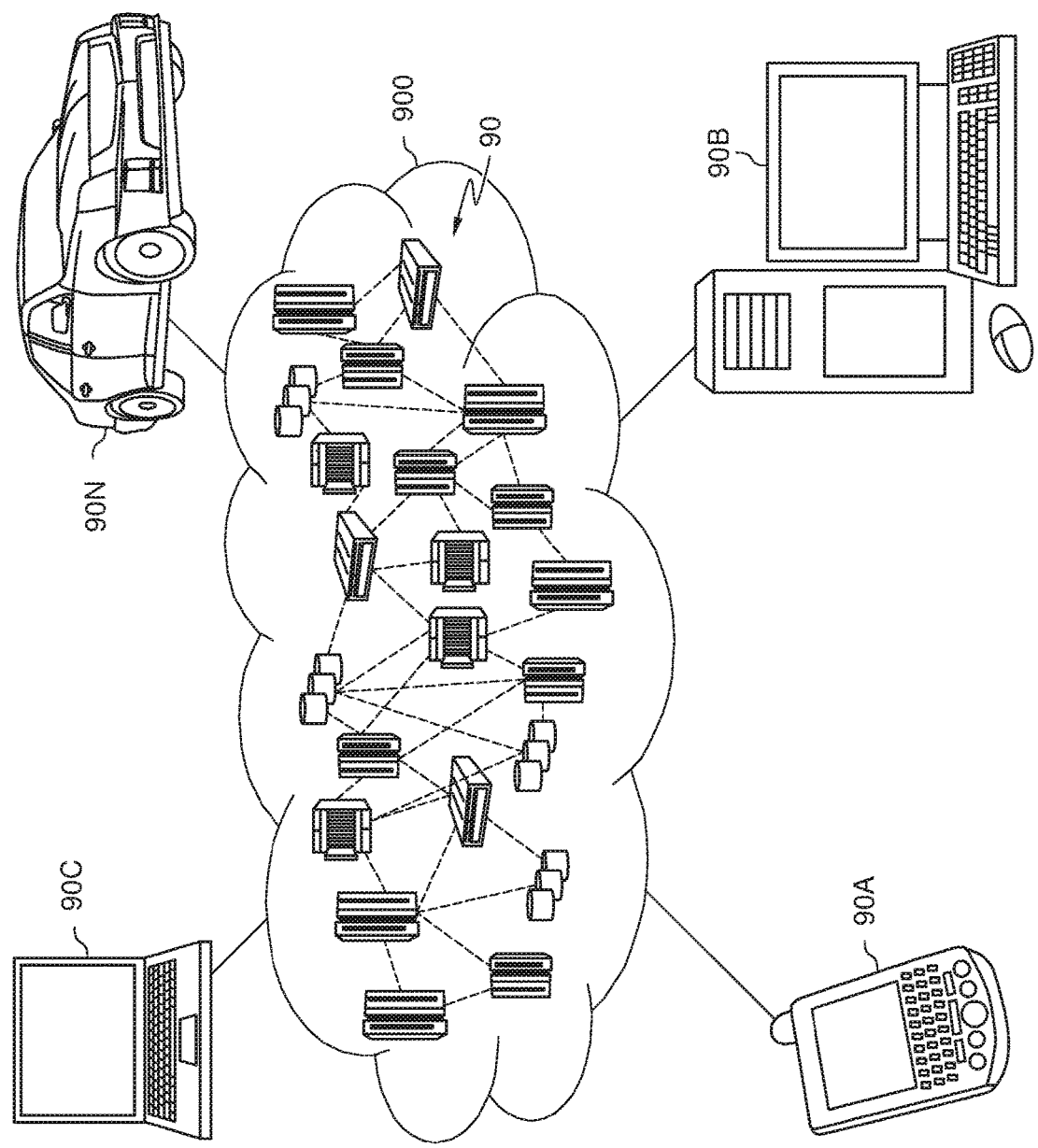
FIG. 9 is a block diagram of an illustrative cloud computing environment including the computers depicted in FIG. 6, in accordance with an embodiment of the present disclosure.

Referring now to FIG. 9, illustrative cloud computing environment 900 is depicted. As shown, cloud computing environment 900 comprises one or more cloud computing nodes 90 with which local computing devices used by cloud consumers, such as, for example, personal digital assistant (PDA) or cellular telephone 90A, desktop computer 90B, laptop computer 90C, and/or automobile computer system 90N may communicate. Nodes 90 may communicate with one another and may include robots and/or drones such as the robots and drones shown in FIGS. 1A-5. They may be grouped (not shown) physically or virtually, in one or more networks, such as Private, Community, Public, or Hybrid clouds as described hereinabove, or a combination thereof. This allows cloud computing environment 900 to offer infrastructure, platforms and/or software as services for which a cloud consumer does not need to maintain resources on a local computing device. It is understood that the types of computing devices 90A-N shown in FIG. 9 are intended to be illustrative only and that computing nodes 90 and cloud computing environment 900 can communicate with any type of computerized device over any type of network and/or network addressable connection (e.g., using a web browser).

Figure 10:
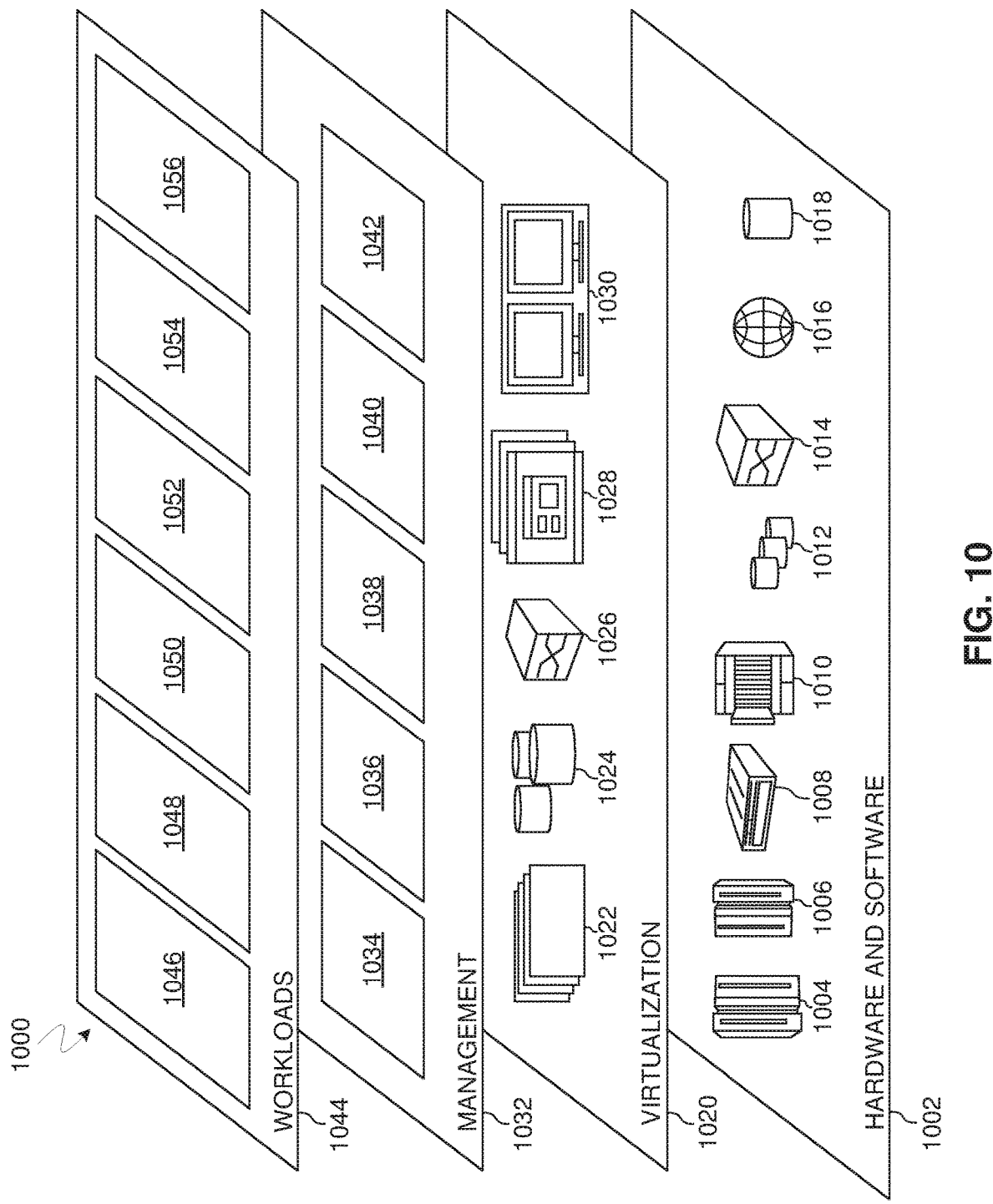
FIG. 10 is a block diagram of functional layers of the illustrative cloud computing environment of FIG. 9, in accordance with an embodiment of the present disclosure.

Referring now to FIG. 10, a set of functional abstraction layers 1000 provided by cloud computing environment 900 is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1002 includes hardware and software components. Examples of hardware components include: mainframes 1004; RISC (Reduced Instruction Set Computer) architecture based servers 1006; servers 1008; blade servers 1010; storage devices 1012; and networks and networking components 1014. In some embodiments, software components include network application server software 1016 and database software 1018.

Virtualization layer 1020 provides an abstraction layer from which the following examples of virtual entities may be provided: virtual servers 1022; virtual storage 1024; virtual networks 1026, including virtual private networks; virtual applications and operating systems 1028; and virtual clients 1030.

In one example, management layer 1032 may provide the functions described below. Resource provisioning 1034 provides dynamic procurement of computing resources and other resources that are utilized to perform tasks within the cloud computing environment. Metering and Pricing 1036 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1038 provides access to the cloud computing environment for consumers and system administrators. Service level management 1040 provides cloud computing resource allocation and management such that required service levels are met. Service Level Agreement (SLA) planning and fulfillment 1042 provide pre-arrangement for, and procurement of, cloud computing resources for which a future requirement is anticipated in accordance with an SLA.

Workloads layer 1044 provides examples of functionality for which the cloud computing environment may be utilized. Examples of workloads and functions which may be provided from this layer include: mapping and navigation 1046; software development and lifecycle management 1048; virtual classroom education delivery 1050; data analytics processing 1052; transaction processing 1054; and robot assistance 1056. A robot assistance program 610*a*, 610*b* and a robot assistance process 700 provide a way to automate alignment of a conveyor which is assisting a robot that is performing a task in a warehouse or manufacturing facility.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for robot assistance, the method comprising:
identifying, via a computer, a position of a first robot in an environment and a range of movement of an arm of the first robot;
generating, via the computer, an alignment plan for moving a first conveyor to be aligned with the first robot so that the first conveyor is engageable with the arm of the first robot within the range of movement of the arm, wherein the alignment plan is for aligning the first conveyor so that the arm of the first robot is capable of accepting an item from the first conveyor, and wherein the first conveyor and the first robot comprise respective supports that are separate from each other; and
transmitting, via the computer, the alignment plan for execution so that the first conveyor is moved according to the alignment plan.

2. The method of claim 1, wherein the first conveyor is an overhead conveyor.

3. The method of claim 1, wherein the first conveyor is a ropeway conveyor.

4. The method of claim 1, further comprising identifying, via the computer, a task being accomplished via the first robot;
wherein:
the alignment plan comprises a first length for the first conveyor, the first length being determined based on the task being accomplished via the first robot, and
the alignment plan comprises positioning the first conveyor so that the first length is within the range of movement of the arm of the first robot.

5. The method of claim 1 wherein the alignment plan is further for moving a second conveyor to be aligned with the first robot so that the arm of the first robot is engageable with the second conveyor within the range of movement of the arm.

6. The method of claim 1, further comprising identifying, via the computer, a position of a second robot in the environment and a range of movement of an arm of the second robot;
wherein the alignment plan is further for moving the first conveyor to be aligned with the second robot so that the arm of the second robot is engageable with the first conveyor within the range of movement of the arm of the second robot.

7. The method of claim 1, wherein the transmitting of the alignment plan occurs to a first drone for the first drone to align the first conveyor.

8. The method of claim 1, further comprising:
sensing, via the computer, a change of position of the first robot in the environment;
generating, via the computer, a conveyor repositioning plan for moving the first conveyor to correspond to the change of position of the first robot; and
transmitting, via the computer, the conveyor repositioning plan for execution so that the first conveyor is moved according to the conveyor repositioning plan.

9. A computer system for robot assistance, the computer system comprising:
one or more processors, one or more computer-readable memories, and program instructions stored on at least one of the one or more computer-readable memories for execution by at least one of the one or more processors to cause the computer system to:
identify a position of a first robot in an environment and a range of movement of an arm of the first robot;
generate an alignment plan for moving a first conveyor to be aligned with the first robot so that the first conveyor is engageable with the arm of the first robot within the range of movement of the arm, the first conveyor and the first robot comprising respective supports that are separate from each other;
transmit the alignment plan for execution so that the first conveyor is moved according to the alignment plan;
sense a change of position of the first robot in the environment;
generate a conveyor repositioning plan for moving the first conveyor to correspond to the change of position of the first robot; and
transmit the conveyor repositioning plan for execution so that the first conveyor is moved according to the conveyor repositioning plan.

10. The computer system of claim 9, wherein the program instructions are further for execution to cause the computer system to identify a task being accomplished via the first robot,
wherein:
the alignment plan comprises a first length for the first conveyor, the first length being determined based on the task being accomplished via the first robot, and
the alignment plan comprises positioning the first conveyor so that the first length is within the range of movement of the arm of the first robot.

11. The computer system of claim 9, wherein the alignment plan is further for moving a second conveyor to be aligned with the first robot so that the second conveyor is engageable with the arm of the first robot within the range of movement of the arm.

12. The computer system of claim 9, wherein the program instructions are further for execution to cause the computer system to identify a position of a second robot in the environment and a range of movement of an arm of the second robot, wherein the alignment plan is further for moving the first conveyor to be aligned with the second robot so that the arm of the second robot is engageable with the first conveyor within the range of movement of the arm of the second robot.

13. A robot system comprising:
the computer system according to claim 9,
the first robot comprising a first support of the respective supports; and
the first conveyor comprising a second support that is separate from the first support and that is part of the respective supports.

14. The robot system of claim 13, further comprising a drone, wherein the transmitting of the alignment plan occurs to the drone for the drone to align the first conveyor.

15. The robot system of claim 13, wherein the first conveyor is an overhead conveyor.

16. The robot system of claim 13, wherein the first conveyor is a ropeway conveyor.

17. A computer program product for robot assistance, the computer program product comprising a computer-readable storage medium having program instructions embodied therewith, wherein the program instructions are executable by a computer system to cause the computer system to:

identify a position of a first robot in an environment and a range of movement of an arm of the first robot;

generate an alignment plan for moving a first conveyor to be aligned with the first robot so that the first conveyor is engageable with the arm of the first robot within the range of movement of the arm, the first conveyor and the first robot comprising respective supports that are separate from each other, the first conveyor being an overhead conveyor; and transmit the alignment plan for execution so that the first conveyor is moved according to the alignment plan.

18. The computer program product of claim 17, wherein the program instructions are further for execution to cause the computer system to identify a task being accomplished via the first robot, wherein:

the alignment plan comprises a first length for the first conveyor, the first length being determined based on the task being accomplished via the first robot, and the alignment plan comprises positioning the first conveyor so that the first length is within the range of movement of the arm of the first robot.

19. The computer program product of claim 17, wherein the alignment plan is further for moving a second conveyor to be aligned with the first robot so that the second conveyor is engageable with the arm of the first robot within the range of movement of the arm.

20. The computer program product of claim 17, wherein the first conveyor is a ropeway conveyor.

\* \* \* \* \*